US011838088B2

(12) United States Patent
Bali

(10) Patent No.: US 11,838,088 B2
(45) Date of Patent: Dec. 5, 2023

(54) WIRELESS REPEATER APPARATUS AND METHODS OF OPERATION

(71) Applicant: Charter Communications Operating, LLC, St. Louis, MO (US)

(72) Inventor: Ramneek Bali, Frisco, TX (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 346 days.

(21) Appl. No.: 17/019,033

(22) Filed: Sep. 11, 2020

(65) Prior Publication Data
US 2022/0085860 A1 Mar. 17, 2022

(51) Int. Cl.
*H04B 7/06* (2006.01)
*H04B 17/336* (2015.01)

(52) U.S. Cl.
CPC ......... *H04B 7/0695* (2013.01); *H04B 7/0617* (2013.01); *H04B 7/0632* (2013.01); *H04B 7/0634* (2013.01); *H04B 17/336* (2015.01)

(58) Field of Classification Search
CPC .. H04B 7/0695; H04B 7/0617; H04B 7/0632; H04B 7/0634; H04B 17/336; H04B 7/155; H04B 17/345; H04W 52/242; H04W 52/367; H04W 52/42
See application file for complete search history.

(56) References Cited

U.S. PATENT DOCUMENTS

| 11,363,466 | B2 | 6/2022 | Khalid et al. |
| 2013/0086633 | A1* | 4/2013 | Schultz ............... H04L 12/287 726/2 |
| 2021/0037447 | A1* | 2/2021 | Tarighat Mehrabani ................... H04W 40/248 |

OTHER PUBLICATIONS

3GPP., "New SID: Study on supporting NR from 52.6GHz to 71 GHz", 3GPP TSG RAN Meeting #86 (RP-193258), Dec. 2019, 3 pages.
3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.
Article 5 of the Radio Regulations (edition 2001), Introduction to International Radio Regulations, 161 pages.
Federal Communications Commission, Table of Frequency Allocations as codified at Section 2.106, 2014, 141 pages.

(Continued)

*Primary Examiner* — Minh Trang T Nguyen
(74) *Attorney, Agent, or Firm* — Patent Beach PC

(57) ABSTRACT

Apparatus and methods for repeater/extender operation of a wireless-enabled device, including for extending the range or coverage in a wireless network subject to poor signal propagation or obstructions. In one embodiment, the apparatus and methods leverage use of a CPE (consumer premises equipment) configured as a 5G mmWave extender to extend RF signals from one or more base stations (e.g., a NodeB) to one or more other premises. In one variant, the CPE includes (i) a internal unit configured to provide 5G and Wi-Fi services to local UE, as well as other standard CPE functions; (ii) a donor apparatus configured to receive/transmit 5G signals to/from the one or more base stations; and (iii) a service apparatus configured to radiate 5G signals to UE/CPE with weak or no NodeB connectivity. The CPE is configured to create and dynamically update a weighted beam matrix used to select beams.

20 Claims, 14 Drawing Sheets

(56) References Cited

OTHER PUBLICATIONS

IEEE 802.11ad: Introduction and Performance Evaluation of the First Multi-Gbps WiFi Technology by Cordeiro et al., 6 pages, Oct. 3, 2014.
Nokia 5G New Radio (NR): Physical Layer Overview and Performance, IEEE Communication Theory Workshop, 2018 by A. Ghosh, May 15, 2018, 38 pages.
Rappaport T.S., et al., "Overview of Millimeter Wave Communications for Fifth-Generation (5G) Wireless Networks—with a focus on Propagation Models," IEEE Transactions on Antennas and Propagation, Special Issue on 5G, Nov. 2017, 15 pages.

\* cited by examiner

WIRELESS REPEATER APPARATUS AND METHODS OF OPERATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for utilizing premises devices to provide coverage in, and extend the range of, wireless systems (e.g., 5G NR systems using mmWave spectrum).

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Additionally, the 5 GHz band has been allocated for use by, e.g., WLAN equipment.

User client devices (e.g., smartphones, tablets, phablets, laptops, smartwatches, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network or a mobile network operator (MNO) network). A user may generally access the network at a node or "hotspot," a physical location at which the user may obtain access by connecting to modems, routers, APs, etc. that are within wireless range.

Millimeter Wave Communications

NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, NG-RAN leverages technology and functions of extant LTE/LTE-A technologies, as bases for further functional development and capabilities. Furthermore, earlier Releases of 3GPP (e.g., Release 14) have laid the groundwork for many aspects of the 5G specification. For instance, one of the salient features of 5G is extending LTE into the millimeter wave (also referred to as "mmWave") frequency band (24 GHz-100 GHz). Utilizing millimeter wave frequency bands in 5G systems will provide 5G wireless channels with more than ten times greater bandwidth than 4G LTE 20 MHz channel, as well as supporting the requisite ultra-low latency (e.g., 1 ms roundtrip) specified for 5G systems. The higher bandwidth range in millimeter wave frequency bands can increase the effective data rates of the systems to hundreds of Mbps.

In addition to 3GPP 5G, the 57-64 GHz millimeter wave band is currently utilized by recent WLAN technologies; see e.g., IEEE Std. 802.11ad. Using these millimeter wave frequencies in WLAN can improve data throughput from e.g., 1 Gbps in the 5 GHz band to data rates on the order of 7 Gbps or higher. Competing technologies in 60 GHz unlicensed spectrum, such as IEEE Std. 802.11 ay, support up to eight-layer SU-MIMO transmission.

Limitations of Millimeter Wave Systems—

The exemplary 3GPP 5G network specifications referenced above provide utilization of a range of spectrum frequencies, including the mmWave bands such as those of 28 GHz and 39 GHz. The mmWave frequencies provide the availability of very high associated data rates and plentiful spectrum, including as aggregated channel bandwidth of 1 GHz and higher. Systems utilizing the foregoing mmWave frequency bands offer the potential of such very high data rates by exploiting the large amount of available spectrum, coupled with the ability to encode greater amounts of data within any given spectrum due to the high frequency of the carrier(s). For instance, some bands provide 10 GHz of available spectrum, which is more than all the spectrum below 6 GHz currently (partially) used for cellular communications.

Due to this plentiful available mmWave spectrum, carriers and other operators desire to expand usage of mmWave spectrum in conjunction with deployment of 3GPP 5G technology. The use of mmWave will allow increased network capacity and data sharing, including e.g., on backhauls from e.g., gNBs (5G base stations). Such backhauls are often the "bottlenecks" in network performance and throughput (as compared to the air interface between the UE and the gNB). Therefore, the increased bandwidth and spectrum of mmWave can be used to greatly enhance a carrier's network performance and data rate within such backhauls.

Moreover, the increased network capacity improves network Quality of Service (QoS). As previously noted, the increased bandwidth further reduces the overall latency associated with the network, and hence enables some remote applications (e.g., VR/AR, remote healthcare applications, and autonomous vehicles) to experience faster communications via the network.

Likewise, 5G NR contemplates use of mmWave frequencies between base stations or small cells and mobile devices (UEs), such as in dense urban areas, indoors such as malls or stadiums, and the like, acting in effect as a complement to longer-range sub-6 GHz band systems.

Compared with wireless systems utilizing spectrum below 6 GHz, a mmWave-based wireless system experiences substantially different physical characteristics, such as higher path loss and diffraction losses, and stronger directionality. For instance, resonances of oxygen and other gasses in the air may cause certain bands to suffer from comparatively high levels of atmospheric signal absorption, as can rain and snow. Moreover, mmWave frequencies typically suffer very heavy losses when propagating through other media such as building walls. See, e.g., "Overview of Millimeter Wave Communications for Fifth-Generation (5G) Wireless Networks—with a focus on Propagation Models," Rappaport, T. S., et al, *IEEE Transactions on Antennas and Propagation*, Special Issue on 5G, November 2017, which is incorporated herein by reference in its entirety, which describes various physical and path loss issues and models for mmWave systems. Hence, although the mmWave systems offer larger bandwidth and unprecedented data rates, achieving the promised data rates faces several challenges compared to the current 4G/LTE systems or other systems.

Notably, among the mm Wave frequencies, frequencies between 52.6 GHz-71 GHZ are especially interesting because of their proximity to sub-52.6 GHz for which the extant 5G NR system is optimized. Hence, 3GPP Release 17 is currently extending 5G NR operation to the frequency range 52.6 GHz-71 GHz, see 3GPP RP-193258, entitled "NEW SID: Study on Supporting NR from 52.6 to 71 GHz", TSG RAN Meeting #86, Sitges, Spain, dated Dec. 9-12, 2019, which is incorporated herein by reference in its entirety. As described in RP-193258, frequencies above 52.6 GHz are faced with more difficult challenges than the frequency ranges below 52.6 GHZ, such as higher phase noise, larger propagation loss, lower power amplifier efficiencies, strong power spectra, and density requirements.

In addition, 3GPP has initiated further study to define the required changes to 5G NR using the existing air DL/UL air interfaces to support operation between 52.6 GHz-71 GHz. Since these frequencies have a very short wavelength, it enables the use of large antenna arrays at both gNB and UE to be placed in a compact form, where each individual antenna element is placed at a short distance from the other antenna element in the array (at least equal to wavelength/2). For instance, for a 52 GHz waveform, the wavelength ($\lambda$) is on the order of 5.5 mm, and as such individual antenna element can be placed at a spacing of about 2-3 mm, thereby supporting very large numbers of individual antenna elements in very small areas. As such, the Multiple-Input-Multiple-Output (MIMO) transmission techniques, as studied in 3GPP, are required for transmitting multiple spatial layers on the same time-frequency resources to enable efficient data transmission in UL/DL in 52.6 GHz-71 GHz.

Repeaters—

Urban mobility requires ubiquitous coverage from a wireless network deployed in densely populated areas. A future-proof network architecture for urban mobility must support growth in mobile traffic which is estimated at 40% compound annual growth rate (CAGR) between 2017 and 2023. This growth trajectory requires a combination of wide spectrum bandwidth and dense spectrum reuse, both of which are supported by 5G with mmWave spectrum. However, as discussed supra, mmWaves are highly directional, easily attenuated by materials, and diffract poorly around corners. Hence, the resulting coverage constraint with mmWaves leaves capacity significantly underutilized.

One technique to address such poor physical propagation characteristics of mmWave-band energy is through use of a (standalone) repeater. See FIG. 1, wherein a gNB 106 connected to a wireless core 103 radiates signals to (and receives signals from) various user devices, such as UE 112 or CPE 110 (consumer premises equipment) configured for wireless operation. A repeater 115, as the name implies, is typically located such that it can communicate with the NodeB 106 and an intended target UE 112*a* or coverage area (which may be blocked by e.g., the building 107 shown), such a e.g., via LOS, and "repeat" the signals received from either device and transmit them to the other, in effect forming an indirect relay. The cost of such repeaters 115 is significantly lower than that of the 5G NodeB owing to lower technological complexity. Combined with the absence of the need for backhaul (e.g., fiber backhaul to support 5G bandwidths and performance requirements), repeaters present additional cost savings, as well as a reduction in deployment time relative to NodeB devices. Repeaters therefore provide a very powerful tool in the toolkit for dense urban 5G deployments with a lower TCO/O (total cost of operation/ownership) and reduced deployment.

However, the repeater has its own limitations. Repeaters generally, due to limited capacity/features, do not support beam selection, and must be manually adjusted to obtain desired levels of signal gain. They also require facilities such as electrical power, which adds cost since the repeaters may often not be installed coincident with any extant electrical services. These deficiencies make the deployment of repeaters difficult and labor intensive for the operator, not only at initial installation, but during subsequent operation and maintenance (e.g., operator service personnel and "truck rolls" are often needed to address issues of poor signal quality, antenna misalignment, and intervening obstructions such as foliage growth.

Moreover, due to absence of a backhaul a service provider network that also serves the end-user customer devices such as the UE or CPE), coordination between the repeater and the service provider network cannot be done via the CPE.

Accordingly, what is needed are improved apparatus and methods for, inter alia, providing and/or extending coverage of wireless systems such as e.g., 5G NR systems operating in mmWave bands. Specifically, what is needed are methods and apparatus to efficiently provide wireless service with comparatively high levels of performance (e.g., high data rates on both DL and UL) for CPE/UE that lack coverage (whether on a temporary or more permanent basis), and with a lower total cost of operation (TCO) and reduced capital expenditures (CAPEX) for installation and maintenance.

SUMMARY

The present disclosure addresses the foregoing needs by providing, inter alia, a wireless (e.g., 5G) repeater CPE and methods for operating and utilizing the same.

In one aspect of the disclosure, a computerized method of operating a premises wireless apparatus to extend wireless signal connectivity with at least one base station is described. In one embodiment, the computerized method includes: utilizing at least a first wireless interface of the premises wireless apparatus to provide a wireless service to at least a first user premises; utilizing at least a second wireless interface of the premises wireless apparatus to cause data communication between the premises wireless apparatus and the at least one base station, the data communication enabling at least one of (i) beam selection, (ii) beam steering, or (iii) beam redundancy; and utilizing at least a third wireless interface of the premises wireless apparatus to extend the wireless service to at least a second user premises.

In one variant of the method, the utilizing at least the first wireless interface of the premises wireless apparatus to provide the wireless service to at least the first location includes utilizing a 3GPP (Third Generation Partnership Project) 5G-NR (Fifth Generation-New Radio) compliant node to transmit signals to one or more areas inside of a structure of the first user premises; and the utilizing at least the third wireless interface of the premises wireless apparatus to extend the wireless service to at least the second user premises includes configuring the premises wireless apparatus to substantially repeat at least parts of the data communication between the premises wireless apparatus and the at least one base station to one or more areas outside of the structure on the premises via one or more antenna elements mounted externally to or on the structure.

In one implementation thereof, the at least one base station includes a Fifth Generation New Radio gNodeB (5G NR gNB); and the utilizing at least the third wireless interface of the premises wireless apparatus to extend the wireless service to at least the second user premises includes configuring the premises wireless apparatus to substantially repeat at least parts of the data communication between the premises wireless apparatus and the at least one base station to one or more areas outside of the structure on the premises via one or more antenna elements mounted externally to or on the structure includes causing transmission of signals within a frequency range between 24 and 100 GHz inclusive.

In another variant, each of the first, second and third wireless interfaces comprise a 3GPP (Third Generation Partnership Project) 5G-NR (Fifth Generation-New Radio) compliant interface configured to operate in within a frequency range between 24 and 100 GHz inclusive at least during performance of the method.

Alternatively, in a further variant, each of the second and third wireless interfaces comprise a 3GPP (Third Generation Partnership Project) 5G-NR (Fifth Generation-New Radio) compliant interface configured to operate in within a frequency band between 24 and 100 GHz inclusive at least during performance of the method; and the first wireless interface includes a 3GPP 4G (Fourth Generation) or 5G-NR compliant interface configured to operate in a frequency band below 6 GHz at least during performance of the method.

In yet another variant, the premises wireless interface includes a wireline modem apparatus, the modem apparatus configured to backhaul at least the first wireless interface of the premises wireless apparatus via a radio frequency (RF) distribution wireline network to a service provider core.

In still a further variant, the method further includes: generating a beam matrix based on evaluation of one or more wireless channels between the second wireless interface and the at least one base station; and selecting at least one beam from the generated beam matrix to use for the data communication between the premises wireless apparatus and the at least one base station. In one implementation thereof, the method further includes: generating a second beam matrix based on evaluation of one or more wireless channels between the third wireless interface and at least one wireless device disposed at the second user premises; and selecting at least one beam from the generated second beam matrix to use for data communication between the premises wireless apparatus and the at least one wireless device.

In another aspect of the disclosure, a computerized method of extending wireless signals transacted between a computerized client device and at least one base station operating in accordance with a 5G NR (Fifth Generation New Radio) air interface technology standard is described. In on embodiment, the computerized method includes: causing a first interface apparatus of the computerized client device to: obtain data relating to all base station and sector signals received at the first interface apparatus, the data comprising data relating to at least one of (i) beam-Reference Signal Receive Power (BRSRP) or (ii) signal-to-interference-plus-noise ratio (SINR); provide a beam index and channel quality indicator (CQI) report to the at least one base station; based at least on the data relating to at least one of (i) BRSRP or (ii) SINR, generate a beam matrix; based at least on the beam matrix, select and activate at least one first beam for provision of data communication between the at least one base station and the computerized client device; and causing a second interface apparatus of the computerized client device to: transact channel quality data with a target user device; and based at least on the transacted channel quality data, select and activate at least one second beam for provision of data communication between the computerized client device and the target user device.

In one variant, the provision of data communication between the at least one base station and the computerized client device and the provision of data communication between the computerized client device and the target user device provide an end-to-end data communications link between the at least one base station and the target user device.

In one implementation thereof, the wireless signals transacted between the computerized client device and at least one base station comprise millimeter-wave wireless signals which are inaccessible to the target user device due to at least one of an obstruction or physical feature. In one particular configuration, the target user device is disposed at a premises different than that of the computerized client device; and the method further includes providing small cell service coverage for a second user device using a third interface apparatus of the computerized client device. The provision of data communication between the at least one base station and the computerized client device, may include for example providing data communication associated with at user plane (UP) data of the target user device and UP data of the second user device.

In another variant of the method, the target user device includes a mobile user device; and the causing transaction of the channel quality data with a target user device, and selection and activation of the least one second beam for provision of data communication between the computerized client device and the target user device, includes periodic transacting of channel quality data and beam selection in order to account for changes in channel quality due to movement of the mobile user device.

In a further variant of the method, the target user device includes a mobile user device; and the method further includes causing handoff of the target user device to a second computerized client device associated with a common network operator as the computerized client device, the handing off based at least on periodic transacting of channel quality data between the target user device and the computerized client device.

In yet another variant, the causing a first interface apparatus of the computerized client device to, based at least on the beam matrix, select and activate at least one first beam for provision of data communication between the at least one base station and the computerized client device, includes causing the first interface apparatus of the computerized client device to, based at least on the beam matrix, select and activate respective ones of first beam for provision of simultaneous data communication between a plurality base station and the computerized client device. In one implementation thereof, the provision of simultaneous data communication between a plurality base station and the computerized client device includes provision of spatially multiplexed data between a plurality base station and the computerized client device such that each of the plurality of base stations transacts only a portion of the data communication.

In a further aspect of the disclosure, a computerized premises wireless apparatus is described. In one embodiment, the apparatus includes: a first wireless interface comprising a beam steering and beam selection capability, the beam steering and beam selection capability configured to enable alignment the first wireless interface with at least one base station so as to optimize at least reception of a first wireless signal transmitted form the at least one base station; a second wireless interface in data communication with the first wireless interface; processor apparatus in data communication with the first wireless interface and the second wireless interface; and storage apparatus in data communication with the processor apparatus and comprising a storage medium, the storage medium comprising at least one computer program.

In one variant, the at least one program is configured to, when executed by the processor apparatus: enable operation of the computerized premises wireless apparatus in a first mode, the first mode comprising a mode wherein the first wireless interface is used as a backhaul for the computerized premises wireless apparatus; and enable operation of the computerized premises wireless apparatus in a second mode, the second mode comprising a mode wherein the first wireless interface is used as an extension for a wireless-enabled user device in data communication with the computerized premises wireless apparatus.

In one implementation thereof, the first wireless interface is configured to operate as at least a 5G (Fifth Generation) mmWave signal receiver, and the second wireless interface is configured to operate as at least a 5G mmWave signal transmitter of at least a portion of user plane (UP) data received via the first wireless interface, the UP data associated with a user application then operative on the wireless-enabled user device.

In another implementation thereof, the computerized premises wireless apparatus further includes a third wireless interface in data communication with the processor apparatus and configured to provide localized wireless coverage at a premises within which the computerized premises wireless apparatus is disposed. The first wireless interface is configured to for example operate as at least a 5G (Fifth Generation) mmWave signal receiver, and the second wireless interface is configured to operate as at least a 5G mmWave signal transmitter of at least a portion of first user plane (UP) data received via the first wireless interface, the first UP data associated with a user application then operative on the wireless-enabled user device; and the third wireless interface is configured to operate as at least a 5G mmWave signal transmitter of at least a portion of second user plane (UP) data received via the first wireless interface, the second UP data associated with a user application then operative on a second wireless-enabled user device, the second wireless-enabled user device disposed within the localized wireless coverage area.

In another aspect of the disclosure, a method of operating a premises wireless apparatus is disclosed. In one embodiment, the method includes: utilizing a first wireless interface of the premises wireless apparatus as a wireless backhaul for one or more computerized devices of the premises to at least one base station; and based at least on a loss or incipient loss of connection on the first wireless interface during said utilizing, causing the premises wireless apparatus to operate as an extension access point for at least one of the one or more computerized devices, the operation as an extension comprising utilizing a second base station and the first wireless as the backhaul.

In another aspect, a network architecture for delivery of wireless data to at least one obstructed receiver apparatus (e.g., 3GPP 5G NR mmWave enabled UE) is disclosed. In one embodiment, the network architecture includes: a plurality of wireless base stations; a computerized network controller in data communication with at least the plurality of base stations; at least one wireless receiver apparatus; and computerized premises devices capable of data communication with the at least one wireless receiver. The controller is utilized in one variant to enable the base stations and the computerized premises devices to selectively establish communication with the wireless receiver based on e.g., availability of a mmWave signal path at any given point of time, the established communication channel backhauled by one or more of the base stations.

In an additional aspect of the disclosure, computer readable apparatus is described. In one embodiment, the apparatus includes a storage medium configured to store one or more computer programs, such as a multi-mode selection module of the above-mentioned FWA. In another embodiment, the apparatus includes a program memory or HDD or SDD on a computerized network controller device, such as an MSO DP (domain proxy) or network controller server.

In another aspect, methods and apparatus for allocating functionality based on available bandwidth on a backhaul is disclosed. In one embodiment, the methods and apparatus are configured to determine an available type and/or capacity of backhaul which is then currently operational, and based at least on the determination, select one or more functional modes of the CPE for operation, including utilization of the available backhaul. In one variant, the available backhaul is a lower-bandwidth connection such as DOCSIS, and the methods and apparatus are configured to select a repeater mode of operation for the CPE wherein only the fronthaul or downstream devices served in the repeater mode utilize the high-bandwidth (e.g., 5G NR mmWave) backhaul.

In another aspect, methods and apparatus for leveraging existing CPE or premises installations of a network operator to expand wireless coverage are disclosed. In one embodiment, only select premises receive "repeater" enabled CPE, the latter operated to expand coverage of mmWave band communications for e.g., other customers of the network operator.

In another aspect, an integrated circuit (IC) device implementing one or more of the foregoing aspects is disclosed and described. In one embodiment, the IC device is embodied as a 5G NR-enabled SoC (system on chip) device which supports two independent but communicative 5G NR mmWave-based wireless links, including for relay or repeater functionality. In another embodiment, an ASIC (application specific IC) is used as the basis of at least portions of the device. In yet another embodiment, a chip set (i.e., multiple ICs used in coordinated fashion) is disclosed. In yet another embodiment, the device includes a multi-logic block FPGA device, such as for supplying logic for beam forming, steering and selection.

These and other aspects shall become apparent when considered in light of the disclosure provided herein.

Figure 1:
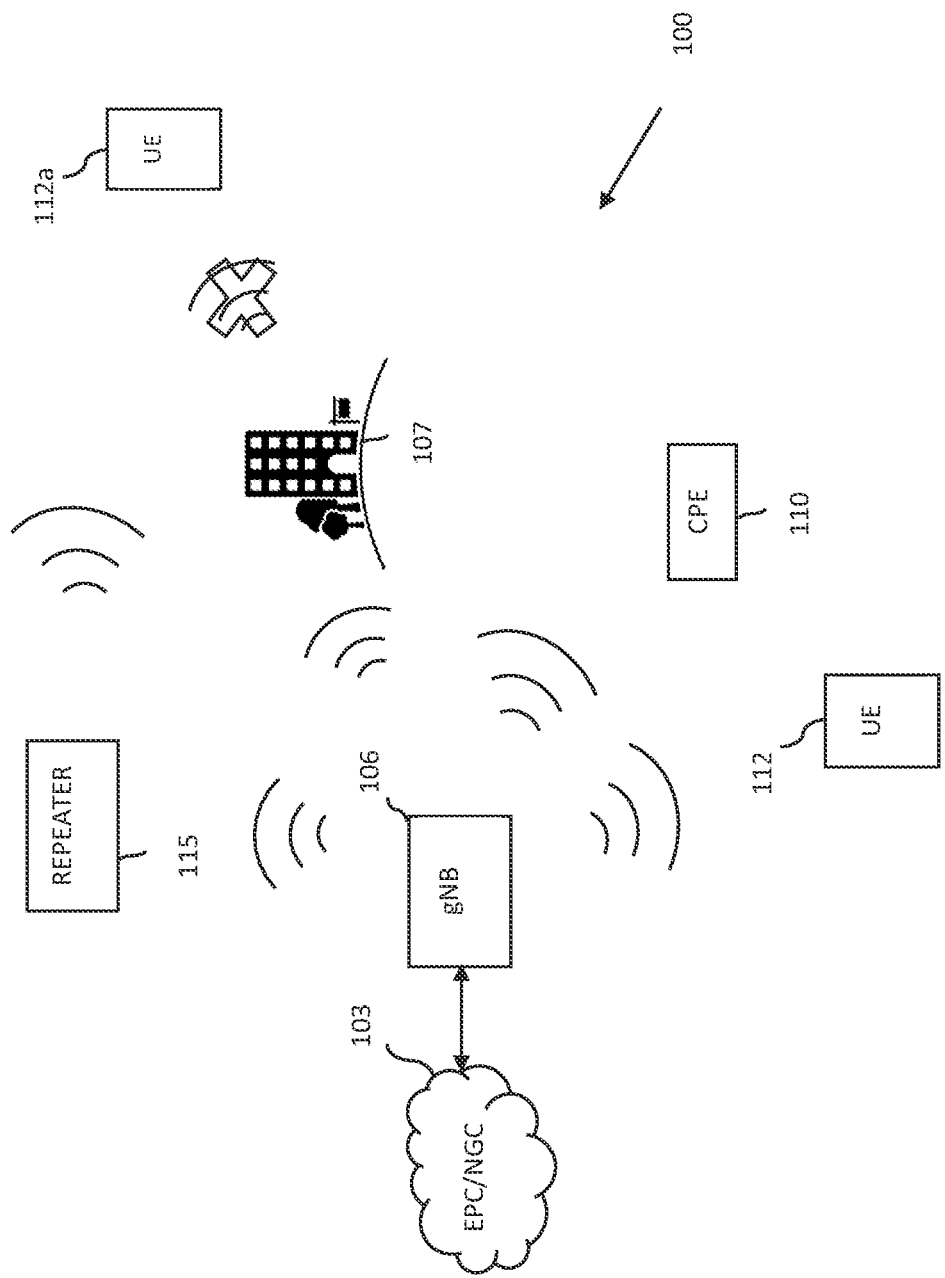
FIG. 1 is a logical block diagram illustrating a typical prior art wireless repeater application, such as used in conjunction with mmWave-based systems.

All figures © Copyright 2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a small cell, a cellular NodeB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, 16, and/or 17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term wireline includes electrical and optical transmission media such as, without limitation, coaxial cable, CAT-5/6 cable, and optical fiber.

Overview

In one salient aspect of the present disclosure, methods and apparatus are provided that enable wireless repeater/extender operation using an enhanced CPE (CPEe), such as one utilized by a network operator for providing customer services such as broadband data and media delivery. Specifically, in various embodiments, the CPEe of the present disclosure is configured to operate as a wireless premises access node for delivery of services to a subscriber premises, and as a cellular (e.g., 3GPP 5G NR) signal repeater for a base station in order to enhance base station coverage area.

In one variant, the CPEe helps the network operator service other CPE, or UE, that are out of the coverage area of a wireless base station such as a 5G NR gNB due to e.g., path loss and/or interference/obstruction to line-of-sight propagation between the CPE and base station, which can be particularly acute for mmWave bands.

Accordingly, in one implementation, the enhanced CPE apparatus may be deployed opportunistically (or even more broadly) in locations where 5G mmWave coverage from base stations will be tenuous or unavailable, thus eliminating the need to deploy 5G base stations or standalone 5G repeaters (as well as facilities such electrical power and backhaul to support such installations), thereby lowering the total cost of operation (TCO) for the network operator considerably. The network operator in effect has several "mini" base stations at its disposal via these enhanced CPE, the latter which also provide services to the premises where they are disposed, and which utilize electrical power (and in some configurations wireline backhaul such as a cable modem and HFC network) existing at the installation site. Utilization of a given CPEe as a repeater can also be performed dynamically, including in some cases involving handovers between CPEe such as for moving target user devices unable to utilize traditional base stations (e.g., full-capability gNBs) of the cellular infrastructure.

In one variant, the CPEe measures available base station/sector signals, and selects one or more base stations/sectors with the best or highest measured signal. In one implementation thereof, the CPEe creates a beam matrix using the CPEe beams and the beams of one or more base stations (e.g., gNBs) with which it can connect. The selected gNB beams can also be associated with multiple gNBs, such that beam redundancy is created. The CPEe selects the best beam(s) from the matrix to use for servicing its own needs, as well as any other CPE serviced by its "repeater" function.

In some configurations, the CPEe includes three individual but connected components: (i) two intermediary/external units (referred to herein as the "donor" unit and "service" unit), each configured with beamforming and beam steering capabilities, and (ii) a central/internal unit which is configured to act as a Wi-Fi router/AP, 3GPP (e.g., 4G or 5G) premises base station or small cell, as well as providing traditional CPE functions such as Layer 2/3 functions for Ethernet networking, PAN networking, and may also include a wireline modem for e.g., DOCSIS, fiber or DSL backhaul. The central/internal unit is disposed inside a structure of a premises (e.g., house of MDU) to provide WLAN and cellular-like connectivity to local UE/clients, while the two intermediary/external units can be disposed externally to the structure of the premises (e.g., mounted on a utility pole, rooftop, or building façade) so as to receive/transmit signals to/from one or more gNBs within range of the CPEe, and "relay" signals to/from UE/CPE out of range or coverage of the gNB.

In other configurations, the disclosed CPEe can utilize the equivalent of spatial multiplexing (SM) by having two or more gNBs transact data with the CPEe in a divided or multiplexed fashion, so as to e.g., increase capacity (such as where one beam/connection to a first gNB supports CPEe local user demand, and a second connection/gNB supports repeater bandwidth for a downstream UE). The CPEe can also maintain multiple connections with different respective base stations for redundancy purposes (e.g., to avoid loss of user service where the signal path between the CPEe and a given base station is interrupted by a transient obstruction).

Detailed Description of Exemplary Embodiments

Exemplary embodiments of the apparatus and methods of the present disclosure are now described in detail. While these exemplary embodiments are described in the context of the previously mentioned enhanced CPE and wireless access points (e.g., NodeB devices) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio/voice). Such other networks or architectures may be broadband, narrowband, or otherwise, the following therefore being merely exemplary in nature.

Moreover, while generally described in terms of unlicensed radio frequency spectrum/bands such as mmWave bands, it will be appreciated that the methods and apparatus described herein are readily adapted to licensed or quasi-licensed spectrum allocation models, including those controlled by a spectrum sharing or allocation entity.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Other features and advantages of the present disclosure will immediately be recognized by persons of ordinary skill in the art with reference to the attached drawings and detailed description of exemplary embodiments as given below.

Enhanced CPE (CPEe) Architecture—

Figure 2:
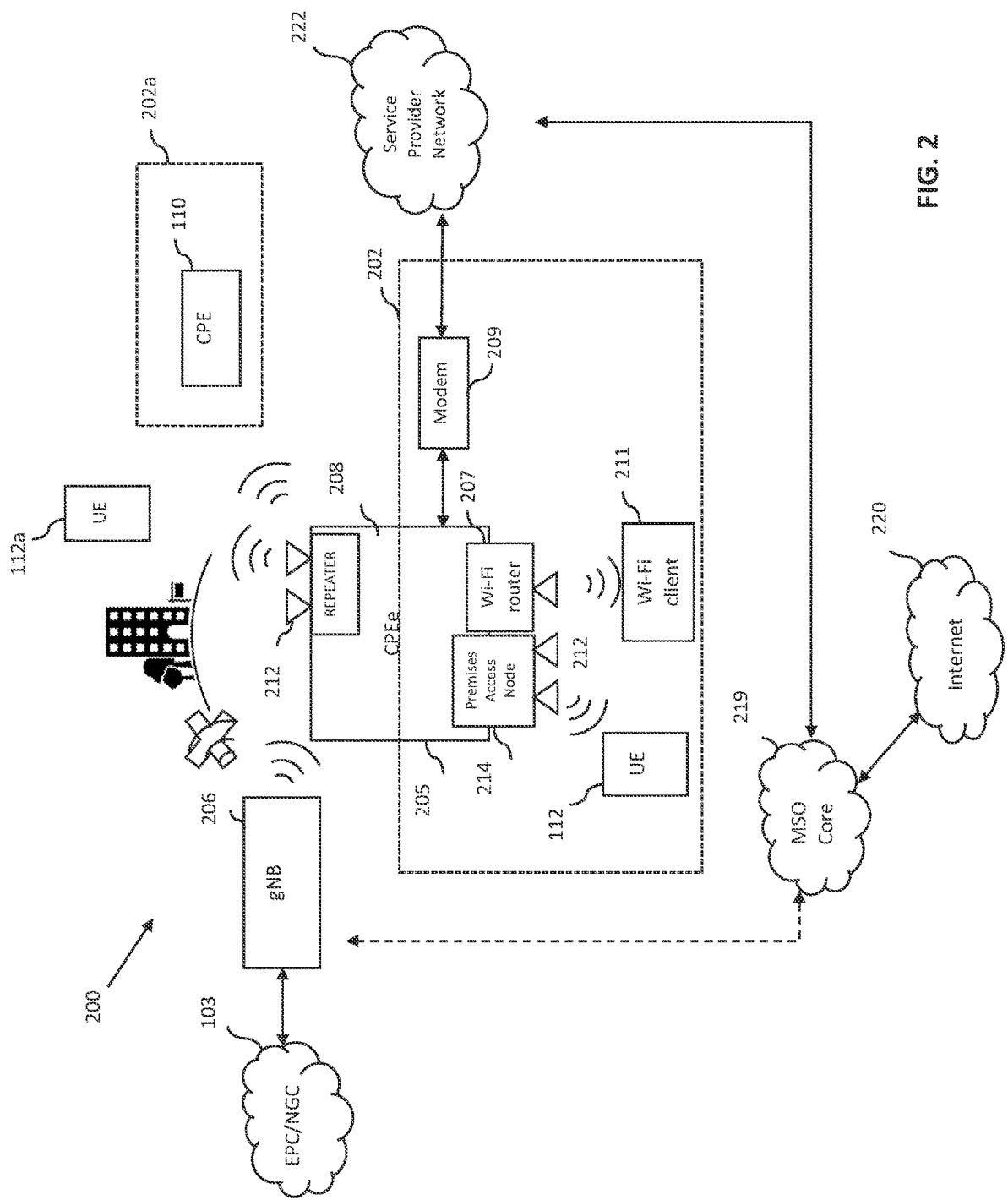
FIG. 2 is a block diagram illustrating a first exemplary embodiment of a CPE configured as a 3GPP (e.g., 5G) signal repeater for a base station (e.g., gNB), according to the present disclosure.

FIG. 2 shows block diagram illustrating one embodiment of a network architecture 200 utilizing the disclosed enhanced CPE (CPEe), according to the present disclosure. In this architecture 200, the CPEe 205 is connected wirelessly to a serving base station (e.g., gNB) 206 for provision of primary backhaul from a premises 202 to the serving (e.g., MSO) network 219.

The exemplary CPEe 205 includes a 5G premises access node functionality 214 to implement 3GPP wireless functionality of the CPE 205 within the premises 202, and 3GPP (e.g., 5G) repeater module 208, each of which may include one or more antennae elements 212 for indoor/premises coverage within one or more user RF band(s). As such, the CPEe 205 shown can in effect operate as a local 5G base station, such as for the delivery or reception of data to or from one or more 5G-enabled client devices or user equipment (UE) 112, via the access node logic 214 resident with the CPEe 205. The logic 214 manages all the control signaling and operation of the CPE device 205 to operate as a 5G NR base station, although it may also be configured as a 4G/LTE device without 5G NR capability if desired.

The repeater module 208 can be utilized to generate and receive RF waveforms for 5G communications through the antennas 212 connected to the CPEe 205, such as in the aforementioned mmWave bands. The antenna elements 212 may be detachable and external to the CPEe 205, such as connected to the outside of the structure of the premises (e.g., pole-mounted or "pod"). It is anticipated that in some embodiments, sectorized antenna elements (versus omnidirectional types of antennae) will be used in each of the repeater 208 and premises access node 214 order to allow activation of only particular sectors at a time for purposes of (i) candidate base station identification and evaluation; (ii) optimization of wireless links between the CPEe and one or more selected gNB; and (iii) optimization/establishment of links between the CPEe and one or more served user devices such as UE 112*a*. As described subsequently herein, the repeater module 208 and/or premises access node can also optionally utilize either or both of (i) physical antenna steering apparatus, which physically move the antenna such as to adjust for misalignment; and/or (ii) MIMO and spatial diversity antenna configurations, which enhance inter alia, coverage of the antenna elements relative to a single antenna element.

The repeater module 208 is configured to repeat 5G signals broadcasted from the gNB 206; e.g., from a prescribed premises or venue (e.g., a house or apt building) to the secondary or served premises or venue, such as when there is weak or no cellular (e.g., 5G) connection at the latter due to e.g., topography, range, spectrum withdrawal (due to e.g., interference considerations, or other) or the presence of a high-interference environment within which the gNB to UE 112*a* link is unable to operate (denoted by "X" in FIG. 2). Accordingly, the repeater 208 provides/extends 5G connectivity to one or more UE 112*a* and/or CPE 205*a* of a premises 202*a*, which is outside the range/LOS of 5G mmWave connectivity.

In an exemplary operation of the device of FIG. 2, the repeater/extender module 208 is wirelessly connected to both the gNB 206 and the obstructed UE 112*a*. The repeater module 208 as such functions as both a wireless interface between the gNB and the CPEe, and the CPEe and the UE 112*a*; this duality can be achieved in one embodiment via use of a single wireless modem having both SIM capability for connection to the host or parent gNB and associated core 103, and also connection capability to the served UE 112*a*. Separate antenna elements 212 may also be provided for each function as shown, such as sectorized antenna each "pointing" at the desired device (base station and UE 112*a*, respectively). As such, the repeater module 208 of FIG. 2 operates like a prior art repeater in some regards, but (i) absent the need for a separate installation locations and facilities support, (ii) in communication with a local access node 214 for local UE servicing, which can also support direct data communication between the local UE 112 and the distance/served UE 112*a* via the repeater, and (iii) coincident coverage by a WLAN AP for local users, which can also support direct data communication between the WLAN client 211 and the remote UE 112*a*.

In one embodiment, the repeater module 208 maintains two RRC connections (i.e., RRC_Connected or RRC_Idle states) with the respective gNB and UE 112*a* utilizing extant 3GPP protocols for each. The user plane (UP) data transacted between the CPEe and the gNB is passed via Layer 2/3 or other such processes to the CPEe-UE connection, and vice versa, such that an effectively seamless "relay" is established between the UE 112*a* and the gNB 206. Notably, the two connections may in some implementations operate using two distinct SIM credentials (one for the served UE 112*a*, wherein the SIM credentials are negotiated with the EPC/5GC 103 in a "pass through" fashion, such that UE authentication and connection with the core does not require a separate SIM for the CPEe for that function, and one for the CPEe indigenous functions such as provision of wireless backhaul for the CPEe, premises small cell 214, and WLAN node, thereby maintaining account separation for the two served premises 202, 202*a*). As such, in the embodiment of FIG. 2, the local small cell 214 in effect acts as another UE accessing the serving gNB 206, with its SIM credentials and authentication data being passed through the repeater module 208 to the serving gNB and ultimately the EPC/5GC.

The 3GPP-enabled user devices 112, 112*a* of the illustrated embodiment can include, for example, mobile devices such as smartphones, tablets with cellular modems, IoT devices, and other devices which can be served off of the premises node 214 and repeater 208, respectively. In one configuration, the premises small cell 214 can operate in a lower 3GPP frequency band (e.g., below 6 GHz) such that it can serve both indoor and outdoor portions of the premises 202, since mmWave frequencies would be limited to indoor use (or outdoor use, but not both). Hence, users at the premises 202 would have cellular-like coverage afforded by the small cell module 214 backhauled by the mmWave (ultra-high bandwidth) repeater module to the gNB, and the downstream users (e.g., UE 112*a* at the second premises) would be afforded a mmWave backhaul (via the repeater) as well. The first premises can also make use of the WLAN interface or yet others (e.g., Ethernet-connected devices at the first premises) which are each also backhauled by the mmWave interface between the repeater module 208 and the serving gNB.

Additionally, as shown in FIG. 2, the Wi-Fi router or access point (AP) 207 and other "sinks" such as an Ethernetwork or LAN at the premises can be connected directly or indirectly to the MSO network 219 via the cable modem 209, such as via a DOCSIS, DSL, or optical fiber modem, such as via a separate service provider network 222 that ultimately connects to the MSO network 219 via the MSO's infrastructure or an internetwork, such as the Internet 220. In other words, the router 207 and other devices (including even the premises access node 214) can utilize the backhaul modem 209 to provide Internet connectivity to the premises, such as in cases where the 5G mmWave backhaul provided by the repeater 208 is inoperative for whatever reason, or simply to provide supplemental capacity to the first premises where the CPEe 205 is located. As but one example, mmWave signals can be subject to degradation/interference in heavy precipitation (e.g., rain) environments; as such, the DOCSIS or other wireline backhaul can supplement or even replace the mmWave backhaul during such periods.

Figure 3:
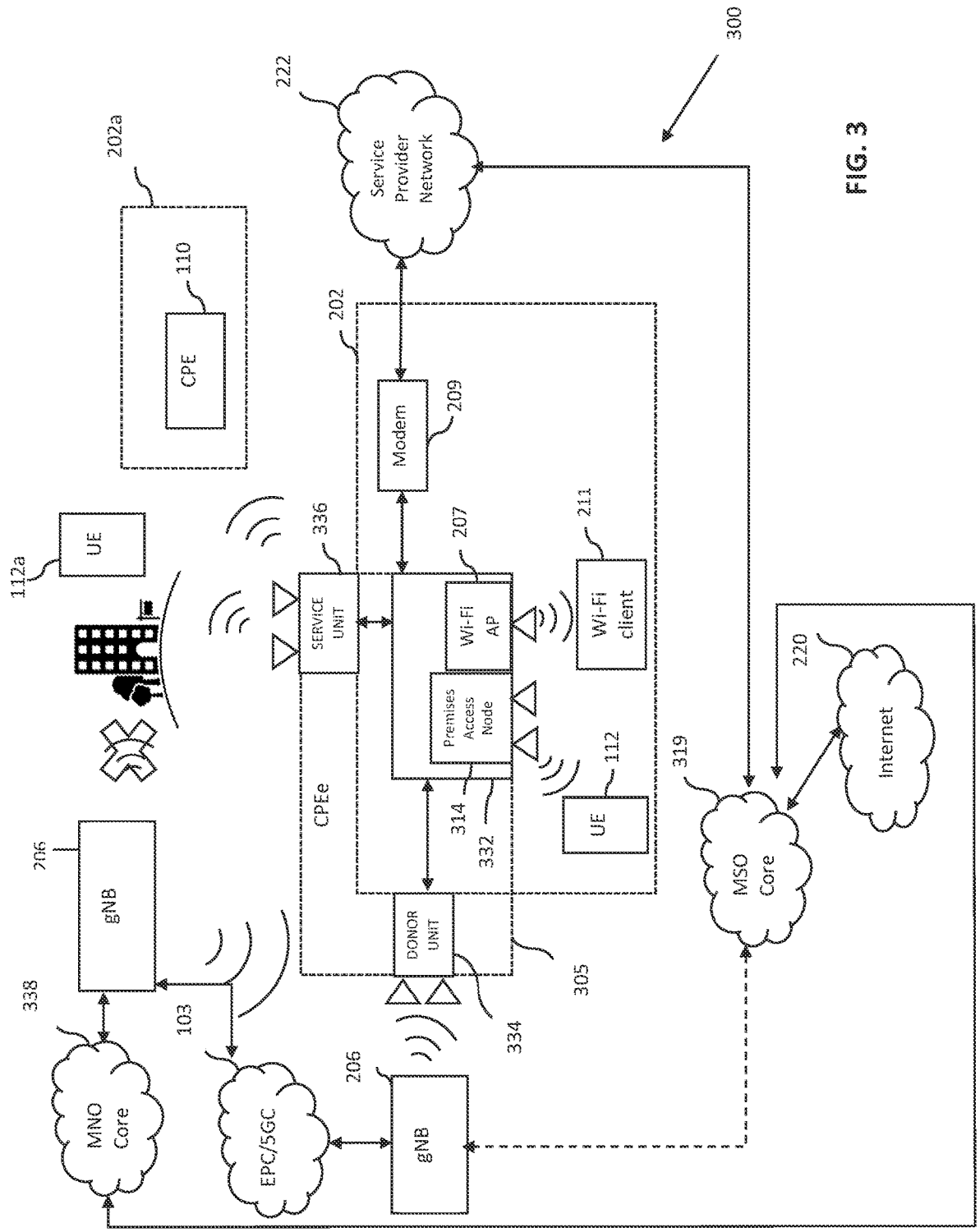
FIG. 3 is a block diagram illustrating a second exemplary embodiment of a CPE configured as a 3GPP (e.g., 5G) signal repeater for one or more base stations (e.g., gNBs), according to the present disclosure.

It will also be recognized that, although one or more CPEe 205 can send data via use of a single gNB 206, as shown in FIG. 2, the present disclosure also contemplates use of more than one gNB 206, as shown and described in FIG. 3. One advantage of this approach of utilizing different gNBs is that, in the event the CPEe 205 loses wireless connection to one xNB, the CPE 205 can wirelessly connect to a different gNB, thereby minimizing service disruption for users/customers/subscribers connected to the CPEe 205 and repeater 208 itself. Additionally, by utilizing different xNBs, the data from different gNBs can be aggregated to increase the data throughput, including using SM (spatial multiplexing).

FIG. 3 shows a block diagram of another architecture 300 illustrating use of the CPEe 305 operating as a 3GPP (e.g., LTE or 5G NR) signal repeater according to the present disclosure. In this configuration, the CPEe 305 extends the 3GPP signals of one or more cellular base stations 206 within signal range of the CPEe 305 to the premises (including, for example, enhancement of existing weak cellular signal at the premises due to e.g., topography, range, etc.), via a central/internal unit 332 and two intermediary/external units, referred to herein as a donor unit 334 and a service unit 336, respectively. In various implementations, the central/internal unit 332 is disposed within a structure of the premises 202, and the donor and service units 334, 336 can be disposed e.g., at or near the premises, such as attached externally to a structure of the premises 202, e.g., on a rooftop, building façade, or other structure which provides at least some signal connectivity to the gNBs 206. Notably, the two units or modules 334, 336 can also be separated physically, such that the donor unit 334 is optimized (and controlled) for communication with one or more gNBs using e.g., mmWave bands, and the service unit 336 can be separately optimized (and controlled) for communication with one or more target (e.g., obstructed) UE 112*a* or CPE 110.

As shown in FIG. 3, the central/internal unit 332 of the CPEe 305 is equipped with at least the premises access node logic 314 and the Wi-Fi router/AP 207, configured to provide coverage within the structure for both cellular and Wi-Fi, as well as in some cases indoor/outdoor mobility, such as via local pole-mounted access node(s) (not shown) with 4G/5G and WLAN capability. Each of the local access node logic 314 and the Wi-Fi router/AP 207 can operate as a backhaul for the local 3GPP devices 112 and Wi-Fi device 211, respectively at the premises, via the cellular base stations 206 (e.g., 3GPP gNBs) that it communicates with via the donor unit 334, and/or via the cable modem 209 that is connected to (either directly or indirectly) to the CPEe 305.

Additionally, the two intermediary/external units 334, 336 operate to provide the 5G repeater/extender functionality described herein; e.g., using a portion of the overall donor unit backhaul bandwidth to service the local access node and WLAN AP, and a portion for the repeater function for e.g., a downstream UE per the service module 336. In one variant, the CPEe-to-target user device (e.g., CPEe-to-UE) wireless link utilizes the same 5G spectrum as the link between the 3GPP gNB 206 and the CPEe (repeater); i.e., mmWave unlicensed spectrum. This advantageously provides very high data rates on both legs of the CPEe data transmission/reception.

In another variant, different spectrum is used for the two links, such as where a lower frequency (e.g., 6 GHz or below) is used for the link between the CPEe 305 and target UE 112*a*. This approach allows for more forgiving misalignment between the service unit's sectorized antenna and the target UE/CPE, as well as the ability to serve more target UE/CPE from a given service unit and donor unit backhaul, since the bandwidth associated with such lower frequency links is much less than that of the mmWave-based donor unit-to-gNB link(s). As previously noted, the present disclosure further contemplates combinations of licensed, quasi-licensed, and unlicensed spectrum use for the various links, depending on the particular application and air interface protocols used. Hence, the donor unit 334, service unit 336, and local node 314 may all utilize different bands of spectrum, different types of spectrum, and/or different access technologies if desired (although use of prevailing 3GPP 4G and 5G technologies in many cases simplifies construction and operation, as well as interoperability with infrastructure of other service providers).

The cellular base station (gNB) 206 is operated by an MSO or Mobile Network Operator (MNO) and is connected to an MSO/MNO core 338. The CPEe 305 in one embodiment contains one or more SIM (subscriber identity modules) (not shown), e.g., associated with one or more wireless service operators. As such, the CPEe 305 acts in effect as a UE (e.g., has an IMEI), and is treated as such by the mobile network with which it connects. In one embodiment discussed in greater detail below, the donor unit 334 is utilized to select a suitable base station or sector or beam to use as backhaul based on e.g., best signal strength (SINR) or BRSRP. In one variant, the CPEe 305 will attempt to register to the MNO network based on appropriate SIM credentials (in one embodiment, according to the standard 3GPP connection and registration protocol via the RACH and subsequent authentication), and is authenticated with the provider, wherein RRC Connected State is ultimately attained, and data communication between the CPEe and the serving gNB(s) occurs. The CPEe 305 is also registered to the MSO/MNO Core 338 as applicable, and may be assigned dedicated or semi-dedicated resources or capacity of the serving gNB 206.

Notably, in some embodiments, the CPEe 305 of FIG. 3 can still function via DOCSIS backhaul if the donor unit 334 (or serving gNB 206) fails or goes down, but service repeater continues to be operative. That is, in the event that the wireless backhaul fails, the wireline backhaul can be readily substituted so as to provide the target UE/CPE at the served premises with connectivity to the MSO core via the DOCSIS or other wireline backhaul.

Exemplary Deployment Configurations—

One salient advantage of using the CPEe 205, 305 of FIG. 2 or 3 as a 5G repeater is coverage area; mmWaves diffract poorly around corners, and the resulting coverage constraint with mmWaves leaves capacity underutilized. That is, a give gNB may not have sufficient LOS or other signal propagation with enough UE or CPE such that it's capacity is not full realized, hence necessitating installation of prior art repeaters or more gNBs (and all of the issues associated therewith as previously described).

In contrast, the 5G Repeater CPEe 205, 305 of the present disclosure has the advantages of, inter alia, (i) reducing the need to manually align the repeater as beam tracking from CPE will be used to align the repeater, (ii) obviating a need for separate power requirement for the repeater, (iii) the repeater and CPE being deployed together where the need for repeater will be identified, and (iv) extending the 5G coverage with much lower TCO.

Figure 4:
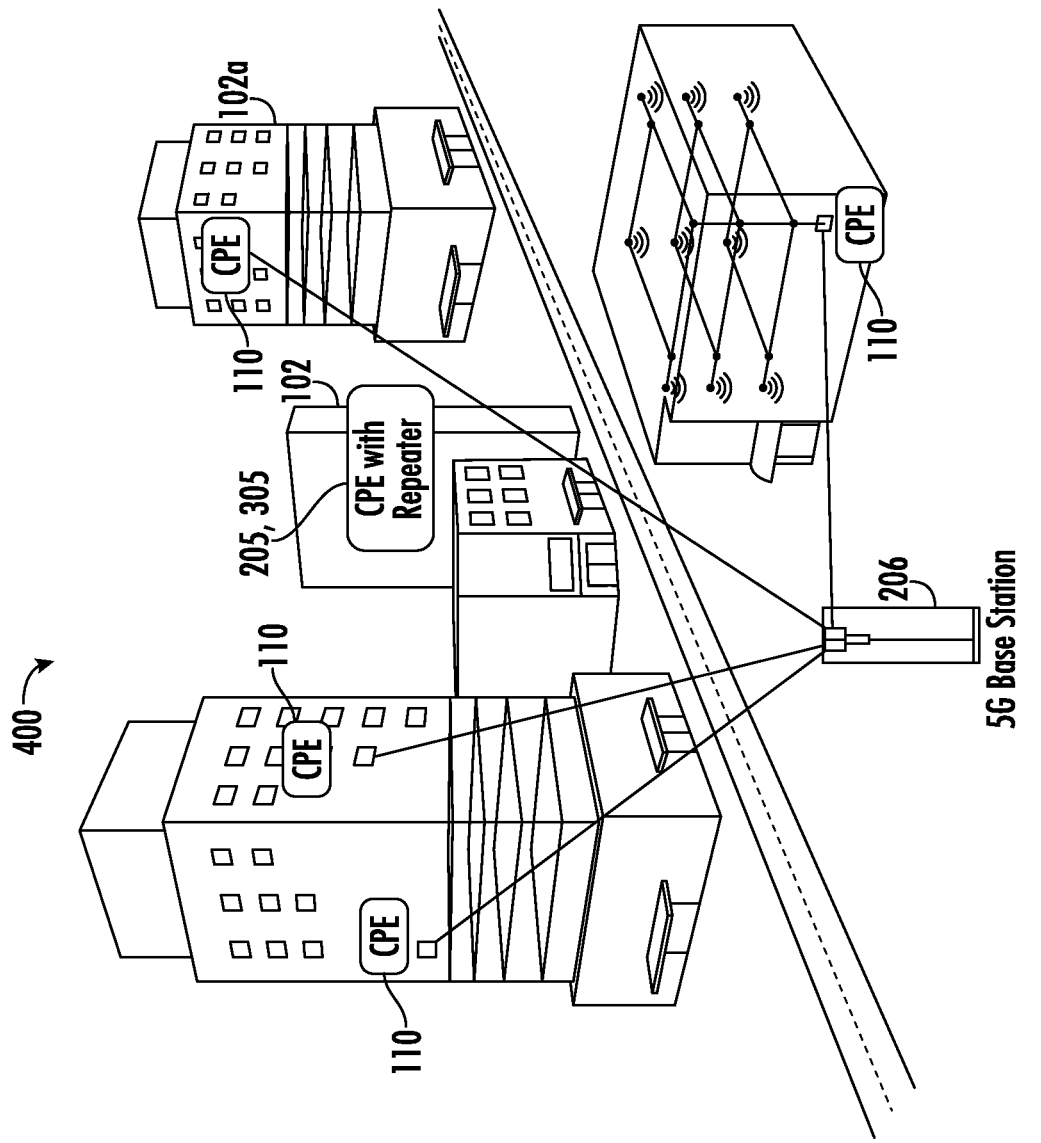
FIG. 4 is a graphical illustration of a first exemplary embodiment of a repeater CPE deployment, according to the present disclosure.

For example, as shown in in an exemplary urban deployment of FIG. 4, the 5G Repeater CPEe 205, 305 can be deployed strategically in locations where 5G coverage from base stations 206 will not reach. The CPEe can be used to provide 5G coverage inside the building 102*a* and the repeater logic of the CPEe can be used to extend the 5G coverage around the buildings or corners, thereby eliminating the need to deploy 5G base stations or standalone 5G repeaters.

Figure 5A:
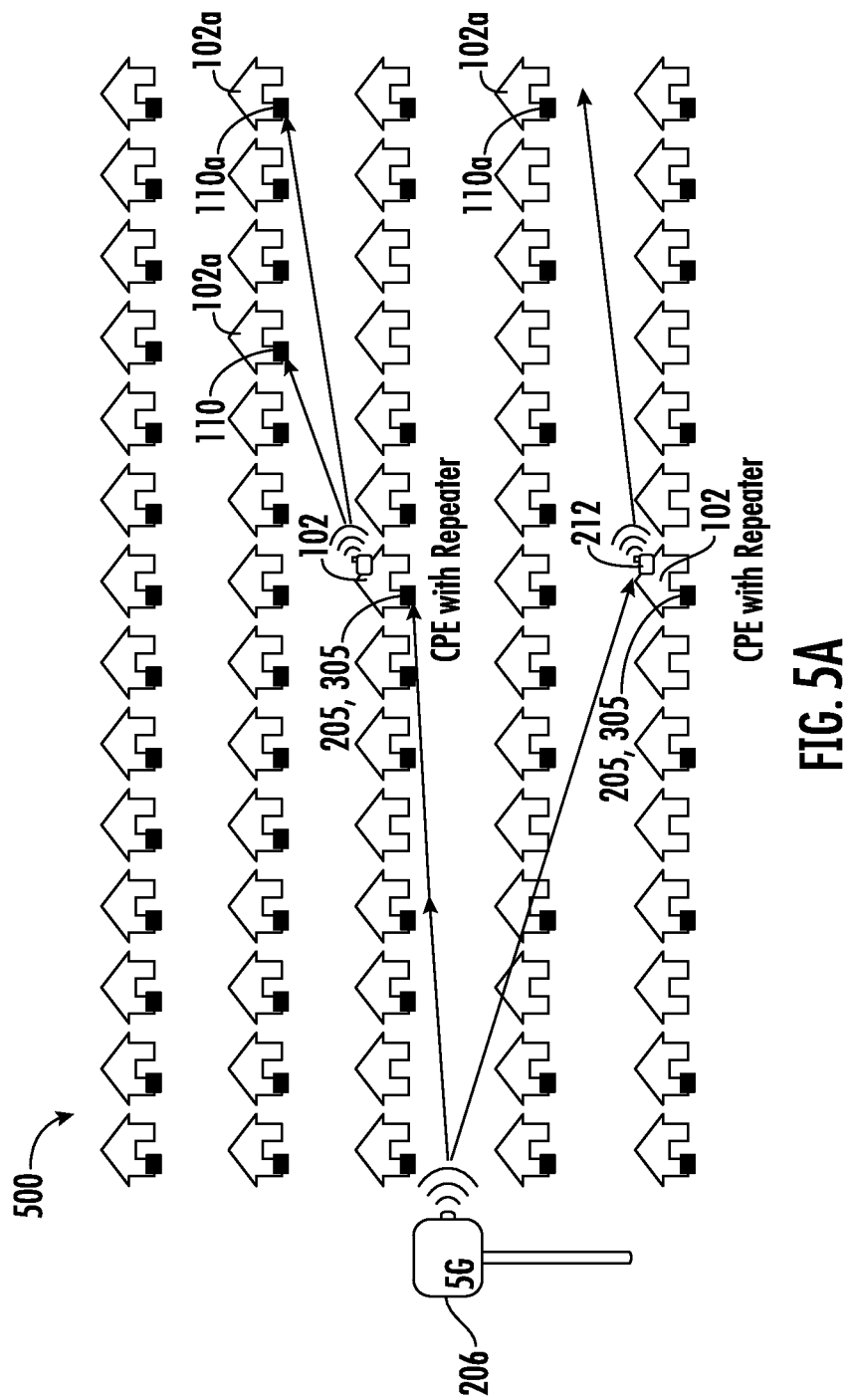
FIG. 5A is a block diagram illustrating a second exemplary embodiment of a repeater CPE deployment utilizing a base station (e.g., xNB) according to the present disclosure.

FIG. 5A illustrates an exemplary deployment of two 5G Repeater CPEe 205, 305 in two respective premises 102 of a suburban area; the two 5G Repeater CPEe each extend 5G connectivity, via one or more links from a single 5G base station 206 to multiple UE/CPE 110, 112 of premises 102*a* that have weak or no cellular (e.g., 5G) connection due to e.g., topography, range, spectrum withdrawal (due to e.g., interference considerations, incumbent usage, or other) or the presence of a high-interference environment within which the gNB and/or CPE is/are unable to operate.

Figure 5B:
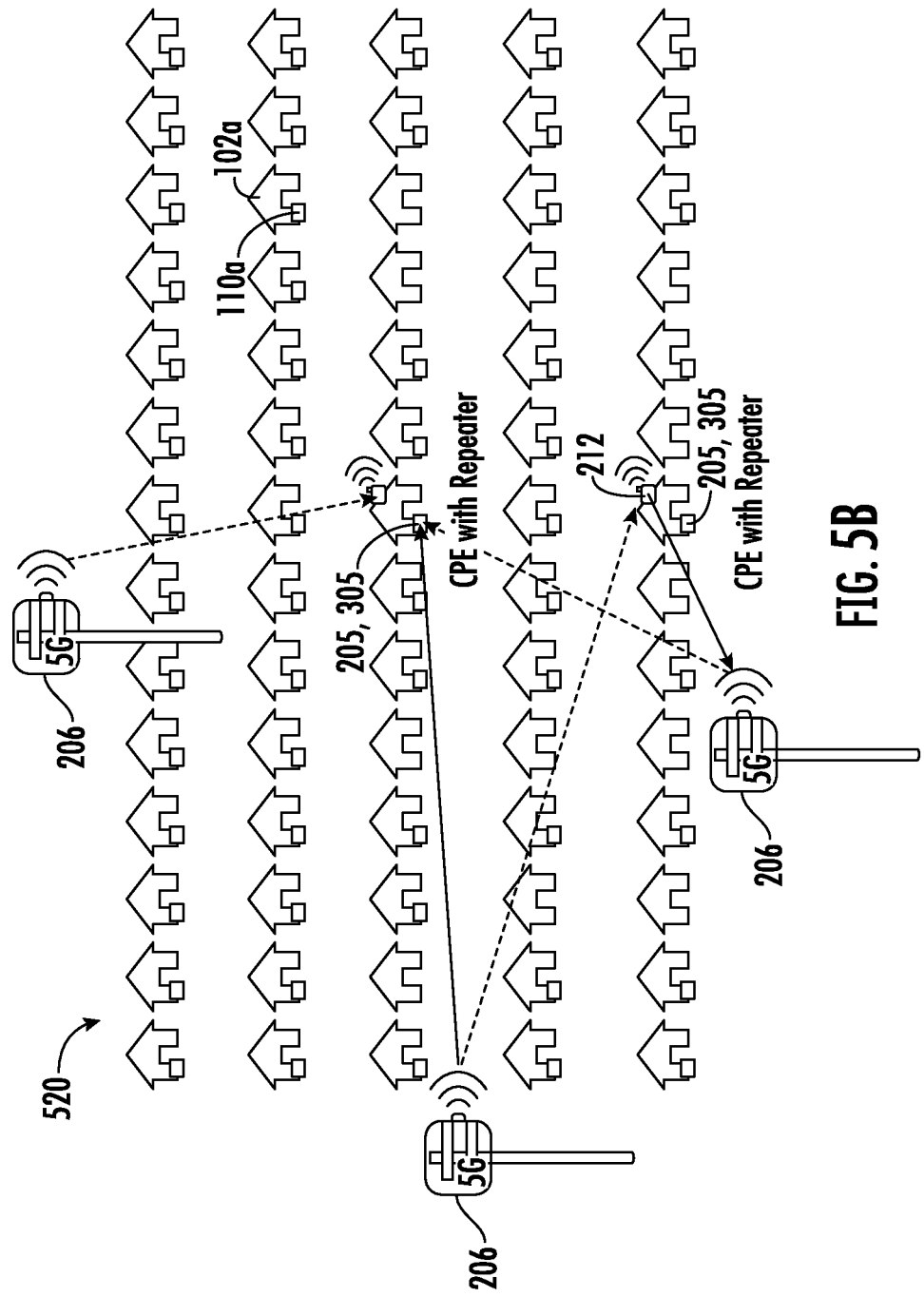
FIG. 5B is a block diagram illustrating a first exemplary embodiment of a repeater CPE deployment utilizing multiple base stations (e.g., xNBs), according to the present disclosure.

FIG. 5B illustrates another exemplary deployment of two 5G Repeater CPEe 205, 305 in two respective premises 102 of a suburban area; the two 5G Repeater CPEe each utilize more than one 5G base station 206 to extend 5G connectivity, via one or more antenna elements 212, to multiple CPE 110*a* of premises 102*a* that have weak or no cellular (e.g., 5G) connection.

As described in greater detail below, one salient advantage of this approach of utilizing different gNBs is that, in the event the CPEe loses its connection to the selected beam from one gNB, the CPEe can select a beam (e.g., based on one or more weighted levels, as discussed in further detail below) from a different gNB. This minimizes service disruption for users/customers/subscribers connected to the CPE and repeater itself. Additionally, this approach can further send the data from the CPE through different gNBs such that data from different gNBs can be aggregated to increase the data throughput, such as via spatial multiplexing techniques.

5G Repeater CPE Apparatus—

Figure 6:
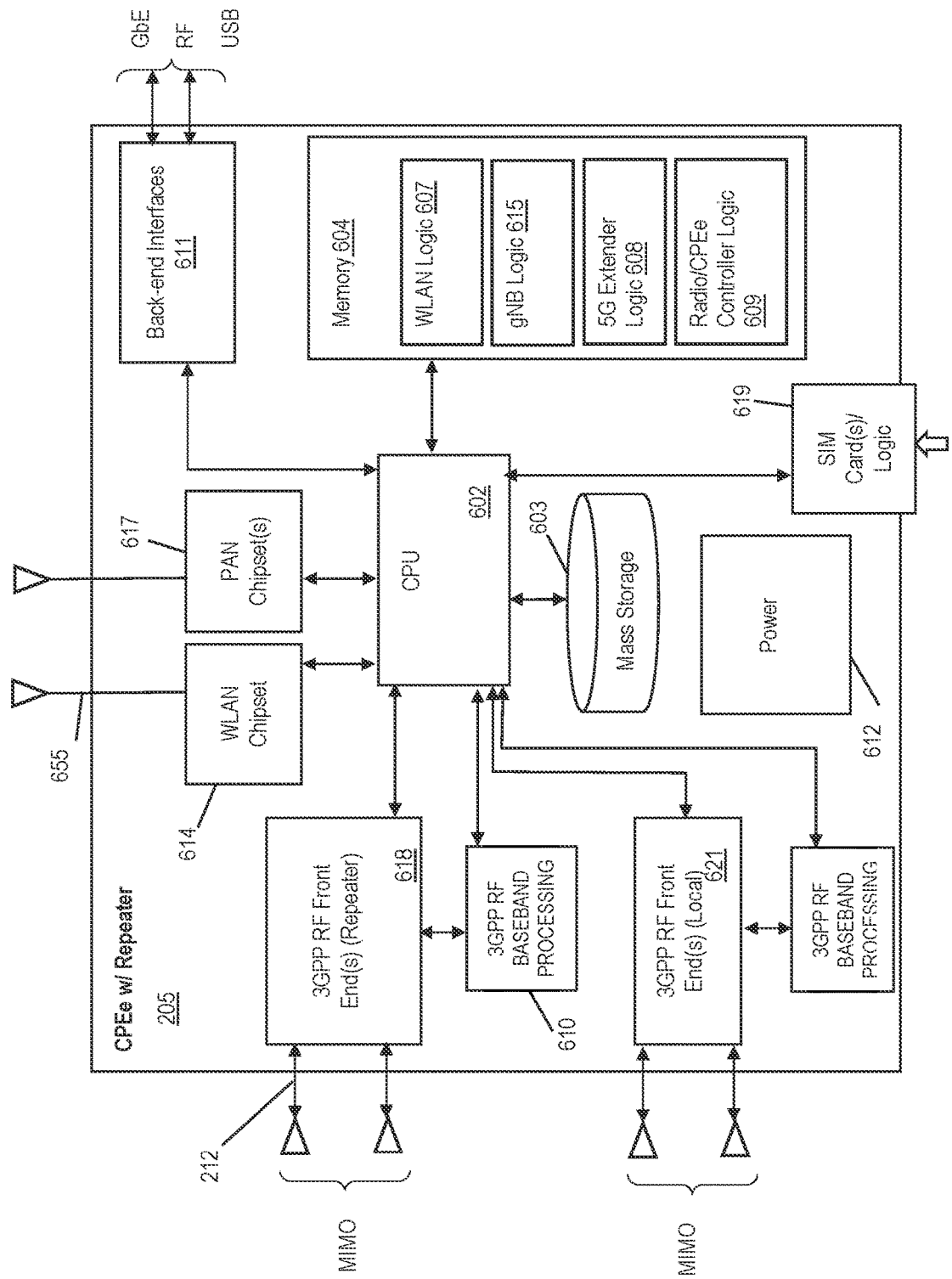
FIG. 6 is a functional block diagram illustrating one embodiment of an exemplary repeater CPE, according to the present disclosure.

FIG. 6 illustrates an exemplary embodiment of a 5G Repeater CPE 205 apparatus (e.g., of the type shown in FIG. 2) configured to provide or extend 5G connectivity, according to the present disclosure. It will be appreciated that while an embodiment of the CPE apparatus is shown wherein all of the foregoing functionality is included, the CPE apparatus may be (i) embodied with lesser or alternate degrees of functionality (e.g., some may have all functions, such as for a premium subscriber premises, while others may have lesser or alternate functions such as based on geographic location or type of subscription—e.g., enterprise versus residential); and (ii) the various components and functions may be divided across two or more physical form factors or discrete devices, such as where part of the functionality is disposed in one or more "radio head" apparatus (e.g., pole- or roof-mounted transceiver), and part in the CPEe (indoor device communicate with the radio head, akin to a modem or gateway or DSTB form factor), and even part within the WLAN router/AP 207.

As shown in FIG. 6, the CPEe 205 includes, inter alia, a processor apparatus or CPU 602, a program memory module 604, mass storage 603, radio/CPEe controller logic module 609, 5G extender/repeater logic 608, gNB logic 615 (which is utilized to effect HNB-type operation of the CPE with the served UE 112, 112a), power module 612, WLAN interface 614, PAN interface(s) 617, and front end wireless network interfaces 618, 621 for communication with e.g., gNBs and local UE, respectively. One or more back end interfaces 611 such as for establishment of, Gigabit Ethernet or other LAN connectivity e.g., via the router 207, support of home or premises gateways, DSTBs, etc., and communication with a wireline backhaul network (such as via an integrated DOCSIS cable modem) where utilized.

The antenna modules in the exemplary embodiment may include each of the MIMO, MISO or other spatial diversity antenna elements. The RF front end modules 618, 621 includes components necessary for receipt and processing of the signals, including logic within the repeater module 618 to determine radio path parameters of interest such as amplitude/RSSI/BRSRP/SINR, phase, timing, as well as receive beam forming logic (e.g., to form two or more discrete receive beams for among other things, spatial or azimuthal resolution of the signals received from the various gNBs 206 in range of the CPEe 205), as well as served 3GPP devices such as local UE 112 for the local module 621. As such, the radio/CPE controller logic 609 (or the beam forming logic) may "steer" the antenna array elements to evaluate or analyze particular azimuth values to scan and acquire RF signals of interest from the various gNBs (or even UE, such as in the case of 5G NR mmWave implementations) using the repeater module chipset 610, 618.

The RF baseband processing module 610 in communication with the CPU 602, is responsible for detecting and demodulating the received RF signals from different paths and combining them into one logical data stream (and converting to an appropriate protocol for distribution within the premises such as IEEE Std. 802.3 Ethernet packets, where Layer 2/3 MAC functionality is included). Combination of the received constituent signals (e.g., user data accessed via the assigned FDD slots and carrier(s) and beams) is accomplished in one embodiment via stream, gNB and beam ID data (i.e., each stream of data from the different beam from a different contributing gNB 206 will have unique ID data that can be used to temporally reconstruct the packet data associated with that stream in proper order and relation).

In the exemplary embodiment, the BB processor 610 may include one or more of a digital signal processor, microprocessor, field-programmable gate array, GPU, or plurality of processing components mounted on one or more substrates. The processor 610 may also comprise an internal cache memory, and is in communication with a memory subsystem, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 610.

The CPU processor 602 is configured to execute at least one computer program stored in memory 304 (e.g., a non-transitory computer readable storage medium); in the illustrated embodiment, such programs include logic to implement the repeater, and radio controller functionality described previously herein (as well as any registration/authentication functionality, not described herein). Other embodiments may implement such functionality within dedicated hardware, logic, and/or specialized co-processors (not shown).

The software stack of the CPEe 205 is also optionally implemented to enable RF detection and reporting functionality, including CPEe functions such as (i) generation and transmission of periodic, on-demand or ad hoc RF detection and CQI reports; (ii) receipt of network gNB controller-generated TDD/FDD slot, carrier, and wireless beam assignments; (iii) communication to network backhaul (whether primary or alternate); (iv) and communication with 3GPP gNBs and other EUTRAN or NR entities such as the EPC or 5GC as required. The logic of the software/firmware stack may also manage other aspects of CPEe operation, including "intelligent" monitoring and storage of data for use in e.g., historical associations or connections with certain gNBs, etc., RF or other parametric characterizations of the various gNB devices in radio range of the CPEe in terms of signal strength, signal identity, required signal levels for communication therewith, and other useful data.

Additionally, as CPEe 205 is capable of both Wi-Fi and 3GPP (e.g., 5G) based communication, in that it include radios for each, the cellular interface will include a SIM card 619, such that local UE 212 or Wi-Fi devices 211 may selectively utilize signals/protocols available to them from the CPEe 205, depending on their logic connection manager (e.g., application operative to execute on the mobile device). For instance, a WLAN-enabled UE might selectively connect using Wi-Fi first, and only in the absence of suitable signal strength, connect to the local RF unit 621 via 3GPP protocols (whether mmWave band, or below 6 GHz, depending on configuration).

Figure 7:
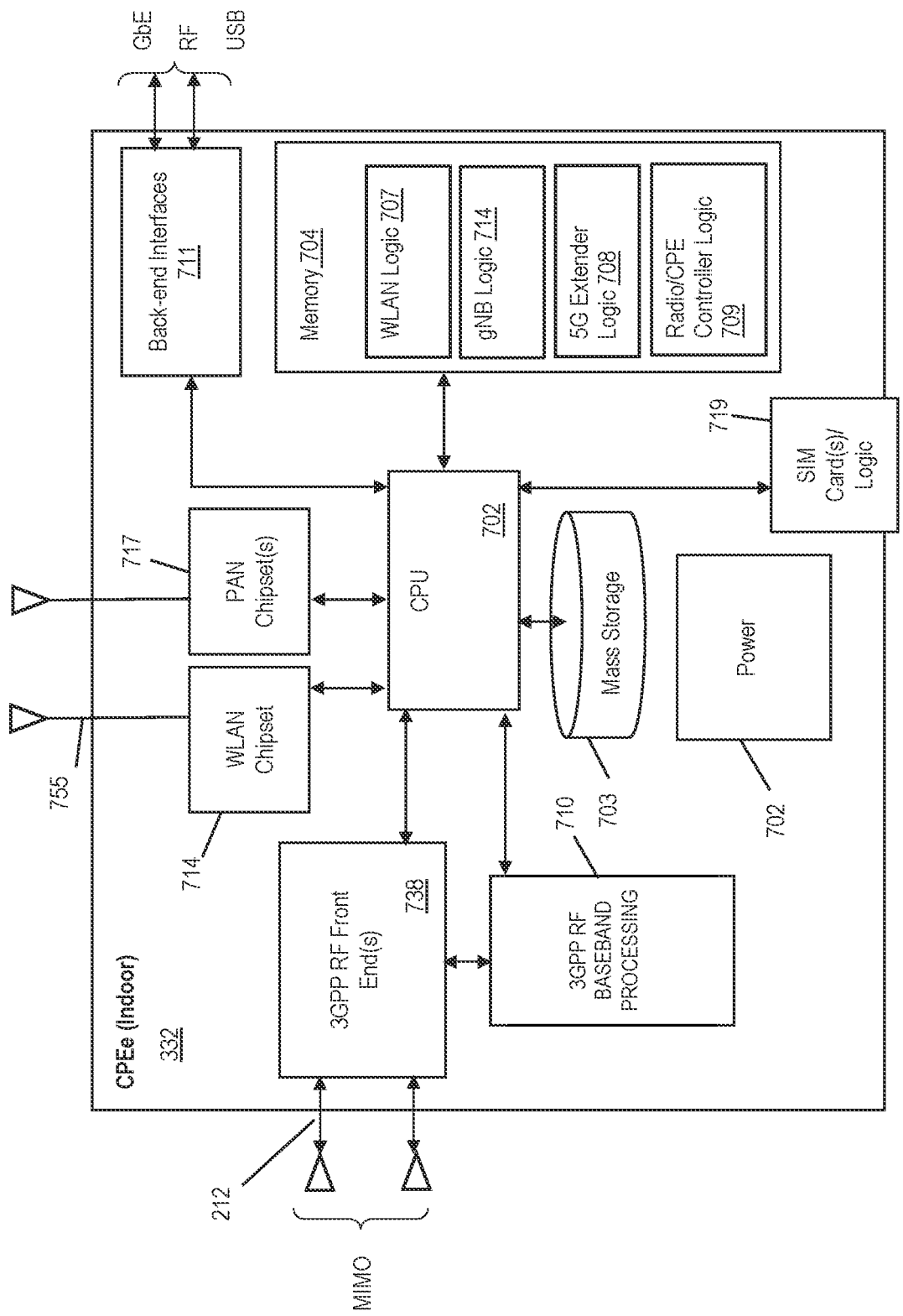
FIG. 7 is a functional block diagram illustrating another embodiment of an exemplary repeater CPE, according to the present disclosure.
Figure 7A:
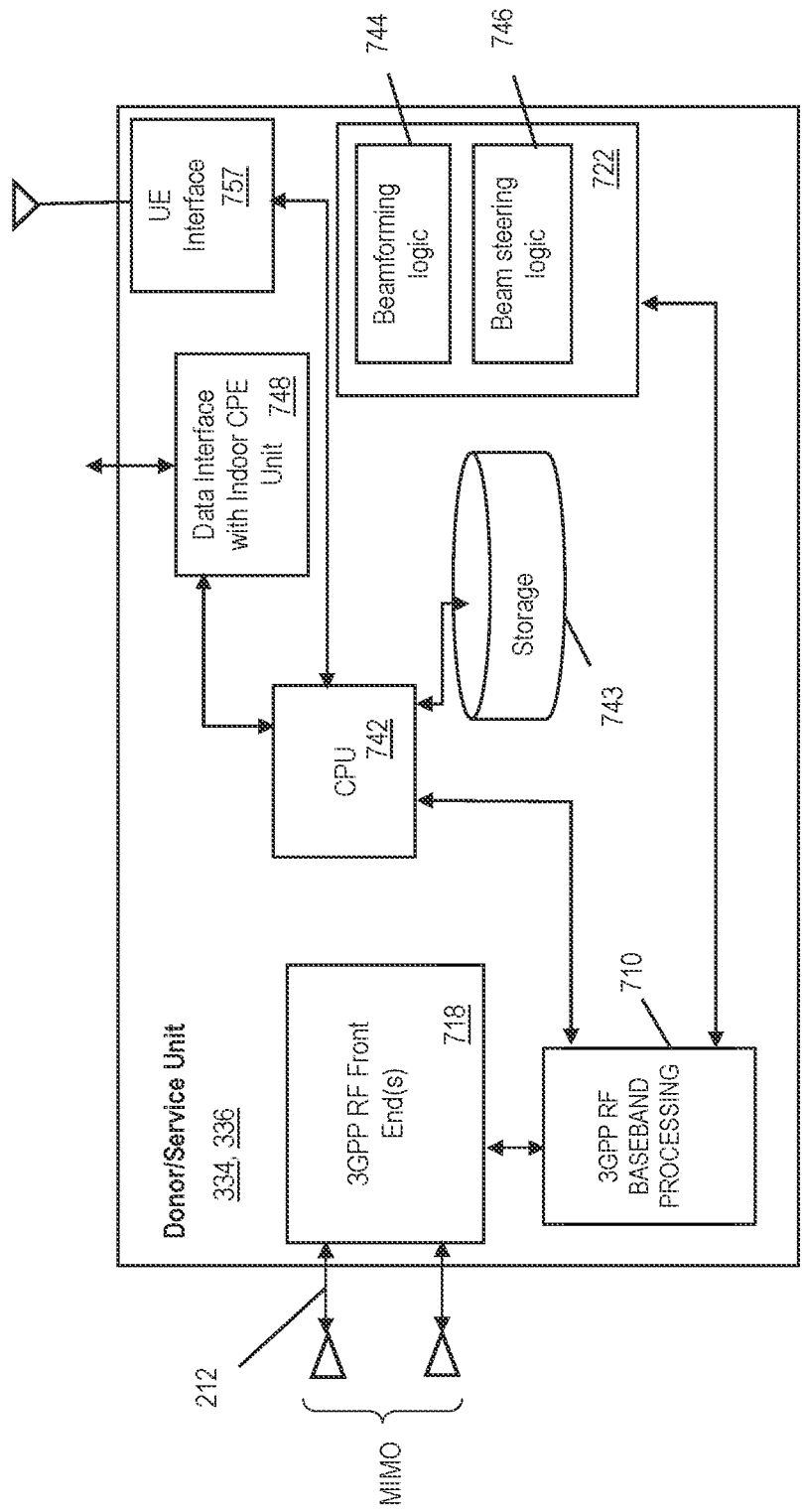
FIG. 7A is a functional block diagram illustrating one embodiment of an exemplary intermediary/external donor or service unit used in the CPE of FIG. 7, according to the present disclosure.

Referring now to FIGS. 7-7A, a second exemplary embodiment of a 5G Repeater CPE apparatus configured to provide or extend 5G connectivity, according to the present disclosure, is described. This embodiment corresponds generally to the CPEe 305 shown in FIG. 3 herein.

As shown in FIGS. 7-7A, the CPEe 305 includes one central/internal unit 332 and two intermediary/external units

334, 336. The central/internal unit 332 includes a Wi-Fi router/AP or logic 707, as well as gNB logic 714, which is utilized to effect HNB-type operation of the CPE with the served UE 112, 112*a*.

The central/internal unit 332 communicates with each of the two intermediary/external units 234, 236 via e.g., high speed data buses and associated cabling (e.g., via GbE or other high speed wireline protocols). The antenna elements 212 of each of the two intermediary/external units 334, 336 in the exemplary embodiment may include each of the MIMO, MISO or other spatial diversity antenna elements, as well as the components necessary for receipt and processing of the signals, including logic to determine radio path parameters of interest such as amplitude/RSSI/BRSRP/SINR, phase, timing, as well as receive beam forming logic (e.g., to form two or more discrete receive beams for among other things, spatial or azimuthal resolution of the signals received from the various gNBs 206 in range of the CPEe 205, and served 3GPP devices such as local UE 212 and target UE/CPE 112*a*, 110 as applicable). As such, radio controller logic 722 (or the beam forming logic) of the donor unit 334 and radio controller logic 724 (or the beam forming logic) of the service unit 336, may each "steer" the antenna array elements 210 to evaluate or analyze particular azimuth values to scan and acquire RF signals of interest from the various gNBs (or UE, such as in the case of 5G NR mmWave implementations).

Additionally, in some embodiments, the antenna elements 212 may be so-called "smart" antennas as used in multi-sector antenna systems. The smart antennas use multiple antennas to shape the beam pattern. The smart antennas use the space dimension to provide control over space and create the desired beam shape. Flexibility and control over the beam shape is achieved through the beamforming process by altering the amplitude and phase of the radiated signals from the individual antenna elements using software defined radio. Smart antennas provide maximum power in the desired direction through steering the main beam in a chosen angle, while nulls can be steered in the direction of interferers.

Radiation lobes of each of the donor unit 334 and service unit 324 can be created so as to maximize the signal-to-interference (e.g., SINR) in one sector. For instance, there may be a strong interference source (not shown) in one sector (e.g., another base station or radiator), and hence the antenna lobe in that sector is optimized (steered or beam-formed, as well as enhanced in transmit power) to maximize the energy towards the desired users in that sector, and null or offset the interference to the maximum degree practicable. It will be appreciated that the foregoing process may be dynamic as well; e.g., the interference source may move with time (e.g., the lobe may change in azimuth), and hence the main user lobe can be steered or formed at an appropriate angle, and power adjusted, so as to maintain a desired useful signal level for the users. This can be applied by the CPEe for both communication with gNBs (via the donor unit 334) and CPE/UE served (via the service unit 336).

In one implementation, the base stations (e.g., gNB 206) may also have "smart" antenna capability that can steer the antenna beam toward the desired target CPEe to maximize the received Signal-to-Interference-Plus-Noise in some part of the cell. This steering may be accomplished via beamforming techniques or so-called "massive MIMO" in 5G NR technology.

FIG. 7A illustrates an exemplary embodiment of the intermediary/external apparatus 334 and 336 of the repeater CPEe 305, according to the present disclosure. Each of the donor apparatus 334 and the service apparatus 336 of the CPEe 305 include one or more wireless antennas 212 (e.g., roof-mounted or pole-mounted apparatus of the premises) capable of operation in desired frequency bands (e.g., those associated with 3GPP LTE or 5G NR bands, which can also include licensed or unlicensed/quasi-licensed), from sector and/or base station 206 via one or more front end wireless network interfaces 718, respectively.

Additionally, each of the donor apparatus 334 and the service apparatus 336 can each include a RF baseband processing module 710, respectively, in communication with their respective CPUs 742.

The antenna units 212 of each of the donor apparatus 334 and the service apparatus 336 are each capable of measuring SINR/BRSRP, and recording the measured SINR/BRSRP for future (such as in the event the base station goes off-air, new CPE are added, etc.). The measured SINR/BRSRP, as well as other data such as data relating to beam indexes/matrices and quality reports, can be stored in the respective storage devices 743.

Figure 10:
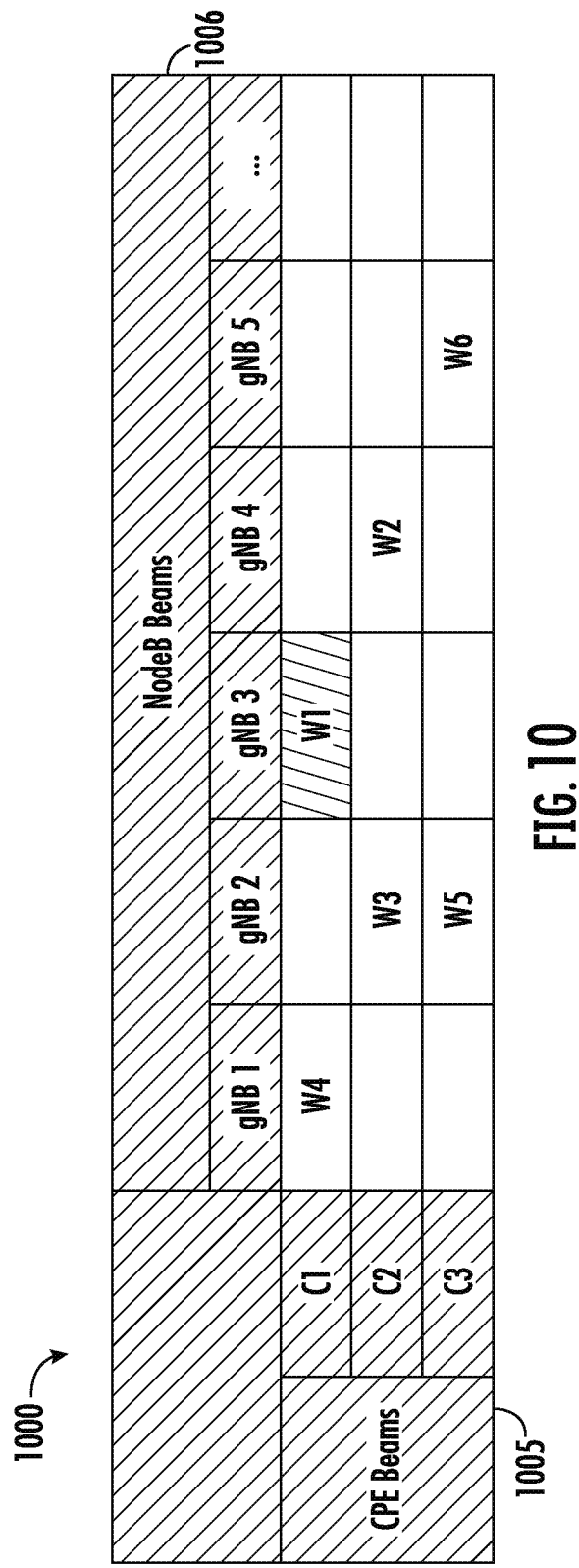
FIG. 10 is a tabular representation of exemplary embodiment of weighted beam matrix, according to the present disclosure.

For example, in one embodiment, the donor apparatus 334 is configured to create a weighted beam matrix (see FIG. 10) based on data stored and obtained from various gNBs 206.

The service apparatus 336 also includes one or more wireless antennas 212 of an optional local UE interface 357 which may utilize a band of wireless chipset capability (e.g., mmWave) for providing the outdoor capability via antenna mounted on the node, the node mounted or disposed in e.g., a publicly accessible place. In one variant, MSO subscribers are given sole access or priority of use of the ad hoc outdoor 5G capability. In other variant, the one or more wireless antennas 212 of the UE interface 357 may form a pole-mounted node "pod" that may be used in some applications which may also act as "street level free 5G" for MSO customers (or even others if permitted) within the footprint of the pole pod (whether transiently within the footprint, or permanently there, such as where a business or residence is within range of the pole pod.

Accordingly, the pod can act as a cellular extender or repeater, which is particularly advantageous in cases where the extant cellular service from an MNO (or unlicensed/quasi-licensed "cellular" offered by the MSO) is poor in that area due to extended range from the closest base station, in dense urban environments where signal propagation may be poor in certain areas, etc.

Methods—

Figure 8:
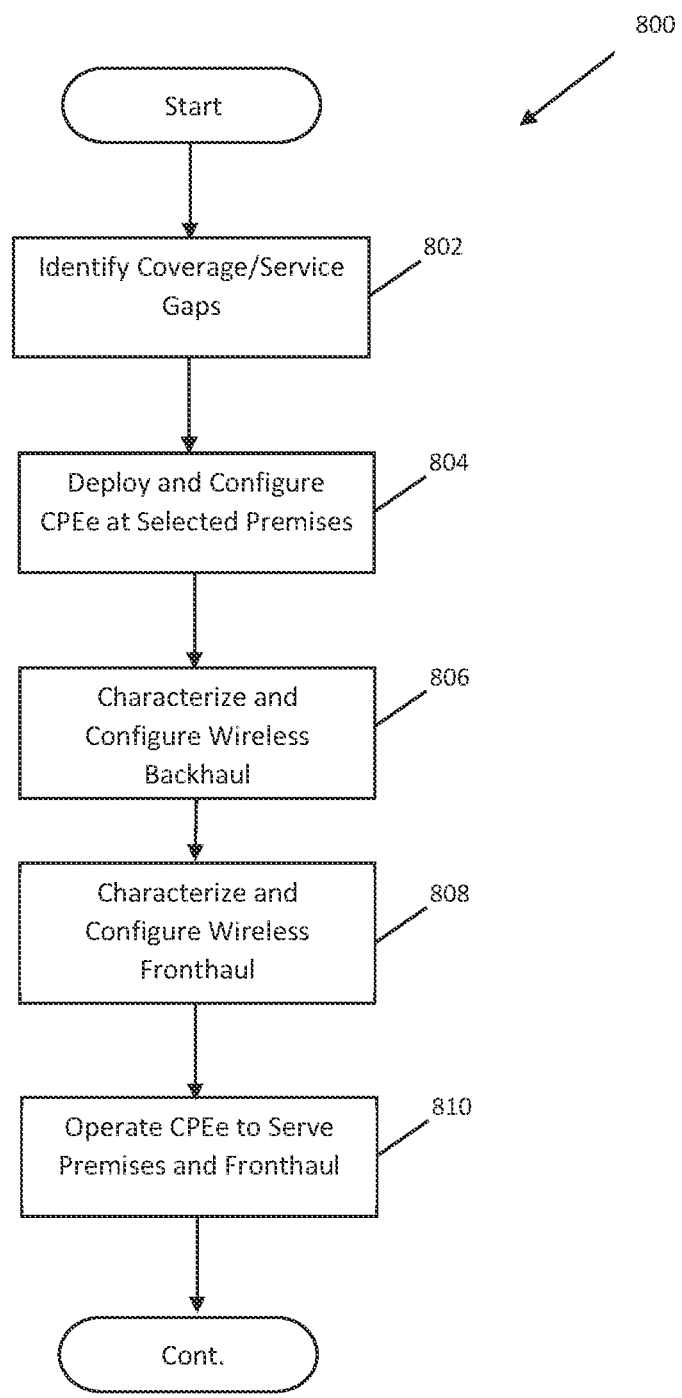
FIG. 8 is a logical flow diagram of the exemplary embodiment of a generalized method for operating a CPEe as a wireless repeater or relay, according to the present disclosure.

Referring now to FIG. 8, one embodiment of a generalized method of utilizing one or more enhanced CPE (CPEe) for provision of expanded or extended coverage is shown and described.

Per step 802 of the method 800, one or more gaps or areas of non-coverage are identified. This identification may be e.g., by the MSO or other network operator identifying a reduced signal strength at a new customer installation premises, or inability of newly installed equipment to connect to a gNB operated by the MSO/network operator.

Per step 804, the CPEe is installed or deployed at a selected premises (i.e., one different from the new installation premises referenced above). This CPEe may be for example pre-existing at that site (in effect, sitting dormant with respect to its repeater capabilities), or an upgrade of extant MSO equipment with a repeater-enabled CPEe. The CPEe may also be servicing one or more other "out of coverage" CPE, the population of which the new CPE is to be added.

Per step 806, the wireless backhaul for the CPEe is characterized (if not already done so), such as by the methodologies described subsequently herein. This allows the CPEe to find and utilize the best gNB(s) for its repeater function.

Per step 808, the CPEe "fronthaul" (i.e., environment between the CPEe and the served or target downstream CPE/UE) is characterized similar to the approach used for the backhaul, except to identify the best beam(s), angles, etc. to utilize for communication with the target CPE/UE. It will be appreciated that while this fronthaul characterization process is described as a single step, it (as well as the backhaul characterization) may in fact be an ongoing, iterative process conducted over any number of different time scales as well, such as in cases where the target UE/CPE is moving.

Lastly, per step 810, the CPEe 205, 305 is operated as a repeater to serve the target UE/CPE, as well as the premises where it is installed (i.e., as a cellular small-cell and WLAN AP, depending on configuration). As described elsewhere herein, this operation may be (i) substantially autonomous (i.e., with the CPEe in effect orchestrating ongoing or supplemental characterizations of its backhaul and fronthaul), (ii) under direction of network entity (such as an MSO network-based controller communicative therewith, whether via the wireless backhaul or the modem/wireline interface if so equipped), or (iii) combinations of the foregoing, Referring now to FIG. 9, one exemplary embodiment of the backhaul characterization (step 806) of the general methodology 200 of FIG. 8 is shown and described. It will be appreciated that while described in the exemplary context of a 5G-based system with gNBs 206, the methodology is in no way so limited.

At step 902 of the method, the CPEe 205, 305 performs beam selection. In one variant, the CPEe selects a beam based on it having a highest BRSRP or SINR out of a plurality or set of beams, as described in greater detail below.

At step 904, the CPEe performs beam steering. In one variant, the CPE logic may be configured to utilize data regarding known base station/sector 206 placements or locations to "beam steer" its MIMO array (if included) towards each of the known base station/sector 206 locations successively in order to ostensibly obtain better signal utilization/path loss with respect to the various base stations/sectors 206, in support of attempts at registration with its associated base station/sector 206. For example, a given CPE may not know a priori whether its inability to connect to its preferred base station/sector 206 is due to an interference, equipment failure, obstruction such as new structure, damage or misalignment of the CPE roof/pole antennae, etc., and hence it can be programmed to assume that the base station/sector 206 is operational, and that the failure to connect may be correctable via (i) retry of the connection protocol; (ii) if failing (i), then "intelligent" azimuth and/or elevation beam steering about the last known coordinates in an attempt to recover sufficient signal strength for a connection.

As a brief aside, each of the sectors of the gNBs (and the CPEe repeater/donor/service modules) may be given a PCI (physical cell identifier) value of its own, such that a scanning CPEe (or correspondingly a target UE/CPE) may encounter multiple distinct PCI values associated with the same gNB (or CPEe), Accordingly different PCI values can also be used as a basis for differentiation between which beams to select, azimuths of interest, etc.

At step 906, the CPEe creates beam redundancy. In one variant, the CPEe logic creates a beam matrix (such as the exemplary beam matrix 1000 of FIG. 10 discussed below) using both the CPEe beams and gNB beams, and utilizes the beam matrix to select redundant beams. The beams of the beam matrix may be weighted, and the weights may be configurable. The redundant beams may be selected for example in order of "score" or weighting, such that the CPEe maintains the best/strongest beam set for redundancy at any given time.

At step 908, a mesh is created for the beam redundancy. In the present context, the term "mesh" refers generally to establishment of two or more concurrent or substantially concurrent connections between a receiver (e.g., CPEe) and two or more access nodes (e.g., gNBs). In one variant, the CPEe logic can use the beam matrix to create a mesh to connect the CPEe to several different gNBs, whether purely for redundancy, or for spatial multiplexing (SM)—e.g., where the CPEe signal is in effect "split" between multiple gNBs. For instance, for redundancy, if for some reason the CPEe loses its connection to the selected beam from an gNB, the CPEe can select the weighted beam from a different gNB. This will help minimize the service disruption for the customers/subscribers/users of the CPEe and repeater itself. This approach can further be configured into sending the data to/from the CPEe through different gNBs, and data from different gNBs can also be aggregated to increase the data throughput (using SM).

Note also that the mesh created in step 908 can be dynamically altered, such as based on interference between one of the "meshed" gNBs and the CPEe.

Figure 9:
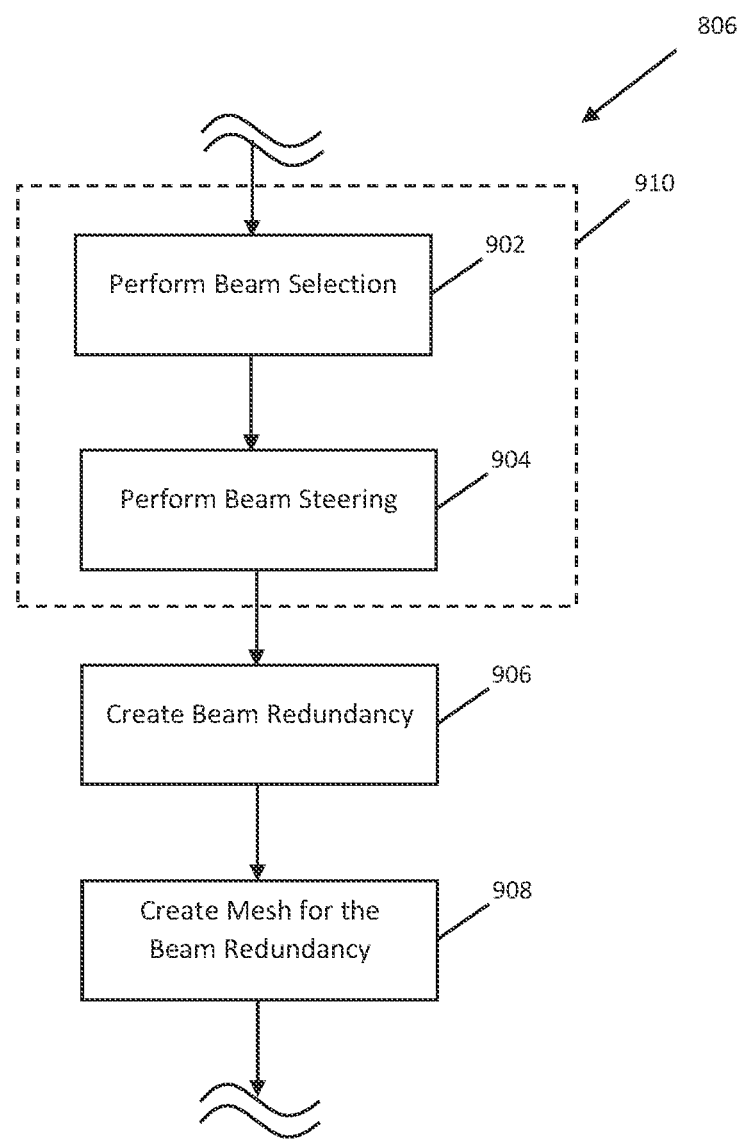
FIG. 9 is a logical flow diagram of the exemplary embodiment of a method for operating a CPEe in conjunction with one or more NodeB devices, according to the present disclosure.

It will also be appreciated that while not shown, the methodology of FIG. 9 can also be extended to the interface (fronthaul) between the CPEe and target CPE/UE. For instance, a given target CPE/U may in fact have LOS or other connectivity with multiple repeater enabled CPEe, such that redundancy and/or spatial multiplexing may be applied on the fronthaul as well. A target CPE/UE for example may maintain its own matrix of beams versus CPEe, and selectively switch between them based on then prevailing conditions (including mobility of the CPE/UE).

Figure 9A:
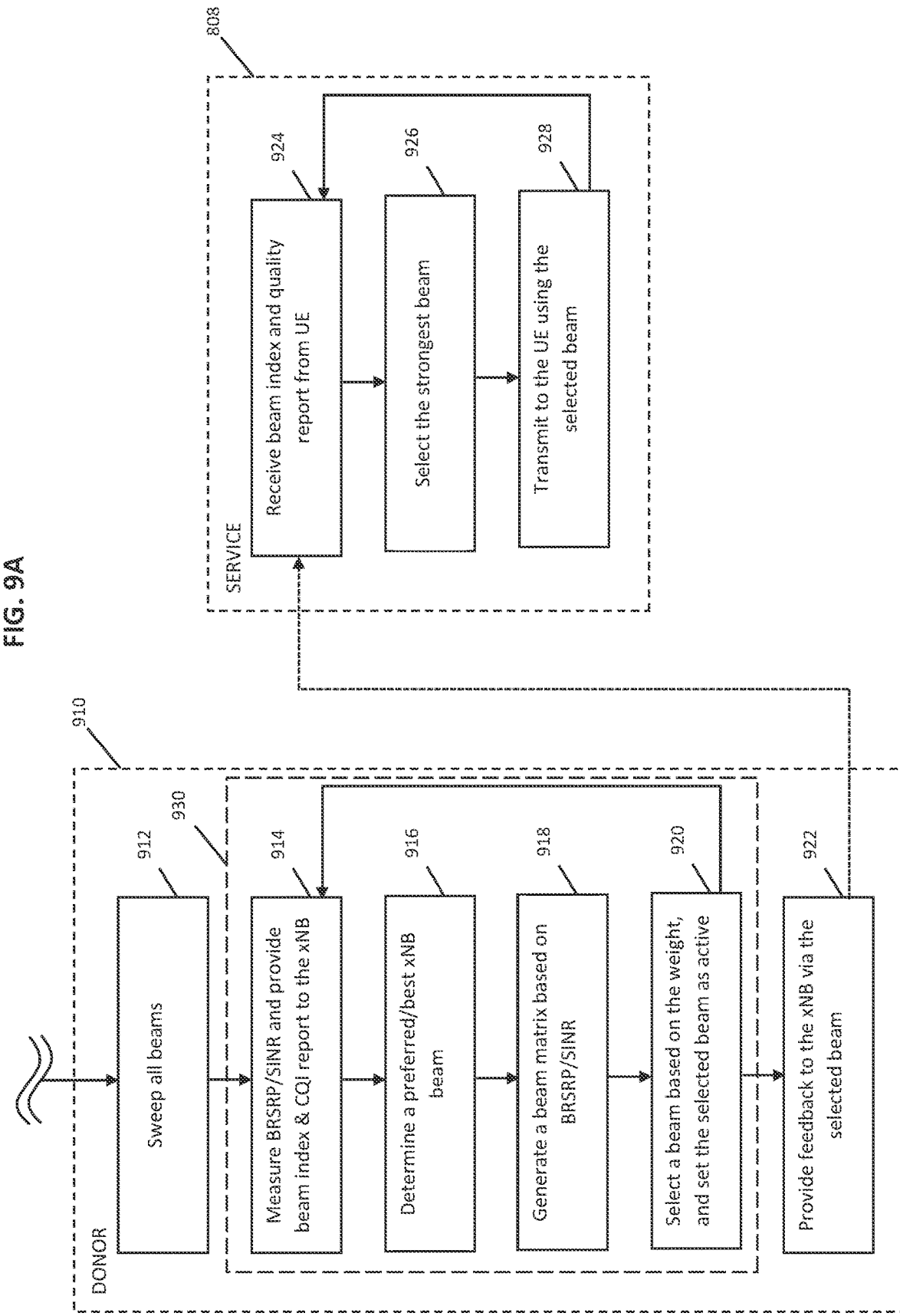
FIG. 9A is a logical flow diagram of an exemplary implementation of the method of FIG. 9, specifically for beam forming and steering, according to the present disclosure.

Referring to FIG. 9A, one implementation of performing beam selection and steering (step 910 of FIG. 9) is shown for a CPEe having a donor unit and a service unit, such as the device of FIG. 3 previously described. Also shown is the corresponding characterization of the fronthaul (step 808 of FIG. 8).

At step 912 of the method 910, the donor unit 334 of the CPE 305 sweeps all beams for all the available base stations/sectors accessible to it. As a brief aside, beam sweeping in one implementation covers a spatial area with a set of beams transmitted and received according to pre-specified intervals and directions. One or more base stations/sectors transmit a plurality of beams in different spatial directions, and may carry unique PCIs as previously described. For example, the base stations/sectors may be configured to either form beams for transmission of at least one of the beams, or sweep/transmit directions, using different ports during a synchronization subframe. The CPEe listens/scans for the beam transmissions from the base stations/sectors in different spatial directions, and is configured to determine a beam index corresponding to a beam based on a time at which a beam reference signal (BRF) is received, including based on PCI where different.

At step 914 of the method 910, the donor unit of the CPEe measures values for at least one of (i) received power and/or (ii) received quality associated with each of the beams from all the available base stations/sectors accessible to it (i.e., the entire beam index). The received power may be in one implementation beam reference signal received power (BRSRP), and the received quality may be signal-to-interference and noise ratio (SINR). Either one of these criteria (i.e., BRSRP/SINR) or both can be set up in the CPEe logic for reporting to the base station, and/or as a basis of scoring or ranking. Thus, the donor unit of the CPEe measures data relating to at least one of BRSRP and/or SINR, and reports the measured BRSRP/SINR to the then connected base-station 206.

As previously referenced, various implementations of the foregoing logic are possible. For example, in one configuration, the CPEe 305 may have a priori knowledge of one or more extant cellular base stations (gNBs) associated with a given MSO or MNO, such as via prior connection therewith. The CPEe may also only have SIM data (e.g., an IMEI) for one MNO/MSO. As such, the CPEe logic may be configured under one paradigm to attempt authentication and connection with that (known) MSO/MNO using that SIM data, and thereafter utilize signals received from the connected gNB(s) to further refine which of the gNBs (and or antenna sectors or spatial diversity channels of its MIMO array if so equipped) it will ultimately use for connection and establishment of the repeater/extender functionality.

In an alternative paradigm, the CPEe can be equipped with multiple SIM devices/data, and in effect run through a logic tree to decide which service provider/MNO to utilize, including based on considerations such as available signal strength/bandwidth, cost per minute or per Gb or data transacted, incentives in place (such as electronic discounts or "coupons" available to the customer by virtue of pre-existing agreements between the customer's MSO and a given MNO), or other. In some such instance, the CPEe 305 may have stored data indicative of prior connections with each MSO/MNO (similar to the paradigm described above), such that it in effect knows which MSOs/MNOs it can viably connect with given its current geographic location, topology, gNB placements, etc. It will be noted that for the CPEe-to-UE (fronthaul), no such logic is generally needed by the target UE/CPE, since it need only identify devices operated by the same network operator (e.g., the cable MSO supplying the CPEe) since those are the only devices it will be authorized to communicate with. The MSO and an MNO may have an agreement where given (target) CPE can normally access MNO (versus MSO) gNBs, but for repeater purposes, such as when the gNB connectivity is lost, only MSO-based repeater CPEe will be eligible for providing fronthaul services to the UE/CPE.

The present disclosure also contemplates a paradigm wherein the existence or connectivity to a given MNO by the CPEe is indeterminate (such as for example at initial install, where the non-volatile memory of the CPEe has been corrupted, or other), such that the CPEe is effectively ignorant of connection possibilities. As such, the CPE repeater logic may be configured to perform "blind" scans of one or more radio frequency bands and/or sectors of its antenna array and, using an energy correlation function (e.g., one based on Zadoff-Chu CAZAC or similar logic), obtain data regarding energy density within certain time/frequency/azimuth resource coordinates, and attempt to effect subsequent connection based thereon (e.g., by attempting 3GPP RACH procedures) using one or more of the SIM data.

Additionally, in one variant, the CPEe may record the measured BRSRP/SINR for future use (such as in the event the base station goes off-air, new CPE are added, etc.). In another variant, the reporting of the measured BRSRP/SINR to the connected base-station 206 is included in a beam index and channel quality indicator (CQI) report/feedback provided to the gNB 206. Additionally, the CPEe 205, 305 and the gNB 206 may exchange other information such as, e.g., beamforming type, analog or digital beamforming capabilities, timing information, configuration information, etc.

As a brief aside, CQI refers to information reported from one device (e.g., the CPEe 205, 305) to another device, such as a base station 206, regarding current communication channel quality being experienced by the reporting device. Typically, CQI is reported from a UE (e.g., the CPEe) to a NodeB, but in the present context, such data may also be reported from a served UE/CPE to the CPEe, as described elsewhere herein. The CPEe can utilize various factors such as for example signal-to-noise ratio (SNR), signal-to-interference plus noise ratio (SINR), signal-to-noise plus distortion ratio (SNDR), beam reference signal received power (BRSRP), etc., to determine a particular CQI value that is indicative of the communication channel quality being experienced.

Based on the received information, the gNB 206 determines various configuration information, such as mmWave network access configuration information, information regarding overlapping coverage (e.g., for predicting a handoff to one or more other gNBs 206), information for adjusting beam sweeping periodicity, etc. The connected base-station may also use the received BRSRP/SINR in a variety of other ways, including passing it to a network entity (e.g., EPC or 5GC process) for further analysis and optimization of the particular CPEe i.e., the aforementioned network-assisted tuning), and/or optimization of the network (or network portion) that includes the CPEe, as a whole.

At step 916 of the method 910, the donor unit 334 of the CPEe determines a preferred/best/strongest beam from the one or more gNB(s) 206. A beam may be considered "preferred" or the "best" or the "strongest" based on one or more of the received power or quality of the respective beams. For example, in one variant, the donor unit of the CPEe 305 selects a particular beam index for a beam with the highest BRSRP and/or SINR and connects to the MSO/MNO, using a standard RACH procedure, is authenticated, and registers to the MSO/MNO. More specifically, once the CPEe 305 selects the beam and sets it to active, the gNB 206 schedules the random-access channel (RACH) opportunity towards the "best" direction selected by the CPEe 05. The RACH is used to perform random access and inform the serving base station of the optimal direction through which it has to steer its beam, in order to be properly aligned to the CPE 205.

At step 918 of the method 910, the donor unit of the CPE 305 creates a beam matrix (such as the exemplary beam matrix 1000 of FIG. 10) using both the CPEe beams and relevant gNB beams. The gNB beams can include beams from multiple gNBs. In one variant, the CPEe ranks the beams in its index based on BRSRP/SINR. In one implementation, both BRSRP and SINR can be allocated one or more weights, which can be configurable.

At step 920 of the method 910, the donor unit of the CPEe selects a beam, and sets the selected beam as active. In one variant, the beam is selected based on the weighted BRSRP and SINR values (which can be configurable). For example, the CPE can select the preferred/best beam based on the highest weighted value per Eqn. (1):

$$W_{beam} = \text{Max}(W_{BRSRP}, W_{SINR}) \quad \text{Eqn. (1)}$$

wherein the value of $W_{BRSRP}$ is e.g., between 2 and 200, and the value of $W_{SINR}$ is also e.g., between 2 and 200. The beam with the highest weight would be considered the preferred or best beam, and would be activated based thereon.

In one variant, the CPEe stores the weighted beam matrix (FIG. 10), and updates the matrix based on continuous measurements (i.e., the BRSRP/SINR measurements). For example, in one variant, a feedback loop approach is used wherein after received BRSRP/SINR is measured and collected by the CPEe, that data is fed to an antenna element control system of the CPEe 205, 305, which utilizes mechanical and electrical internal mechanisms of the CPEe to cause re-adjustment of the antenna elements (e.g., the donor unit 334 and service unit 336 where so equipped), thereby resulting in physical beam-steering to acquire a direction of maximum radiation, so as to maximize the antenna gain in a link with the current serving base station. For instance, the exemplary methods and apparatus described in co-owned and coo-pending U.S. patent application Ser. No. 16/749,539 filed Jan. 22, 2020 and entitled "METHODS AND APPARATUS FOR ANTENNA OPTIMIZATION IN A QUASI-LICENSED WIRELESS SYSTEM," may be used consistent with the CPEe described herein for such purposes, although other approaches and configurations may be used as well consistent with the present disclosure. Electronic steering (such as formation of beams based on relative timing and known spatial relationship between antenna elements) may also be utilized. A path loss model may be used for SINR estimation, and the CPEe may use the path loss model to estimate the SINR, and a threshold used as setpoints by the control loop to maximize antenna gain in the link with the current base station.

At step 922 of the method 910, the donor unit of the CPEe provides feedback (e.g., CQI report, SINR/BRSRP, etc.) to the gNB 206 via the selected/activated beam.

Now turning to the steps of the method 808 of FIG. 9a that are performed by the service unit 336 of the CPEe 305, the beamforming and beam steering capabilities of the service unit of the CPE 205 are described.

At step 924, the service unit of the CPEe 305 receives a beam index and channel quality information (e.g., CQI report) from the target UE 112a (or CPE 110).

The channel quality of the UE 112a is affected by a variety of factors, such as movement of the UE along a path or due to rotation (e.g., a user holding and/or rotating the UE), movement along a path behind obstacles, and/or particular environmental conditions (e.g., obstacles, rain, humidity). Therefore, the channel quality of the UE for mmWave band signals changes as the UE moves, or becomes obstructed/unobstructed. If the target UE/CPE is fixed, then such changes may be minimal/nonexistent.

At step 926, the service unit of the CPEe 305 selects a beam to utilize for the fronthaul to the UE 112a. In one variant, the service unit of the CPEe assigns the UE with a transmit beam that has the strongest signal of the beams indicated in the beam index received from the UE.

The beamforming and beam selection performed by the service unit of the CPEe 305 may be, as previously noted continuously changing/updating as the UE moves, since the channel quality of the UE changes as the UE moves. For fixed installations, the periodicity of updates may be relaxed, or the updates conducted based on events such as loss of channel performance (e.g., data throughput, such as measured by an iPerf or similar process), initiation of either device, high BER/PER, etc.

Figure 9B:
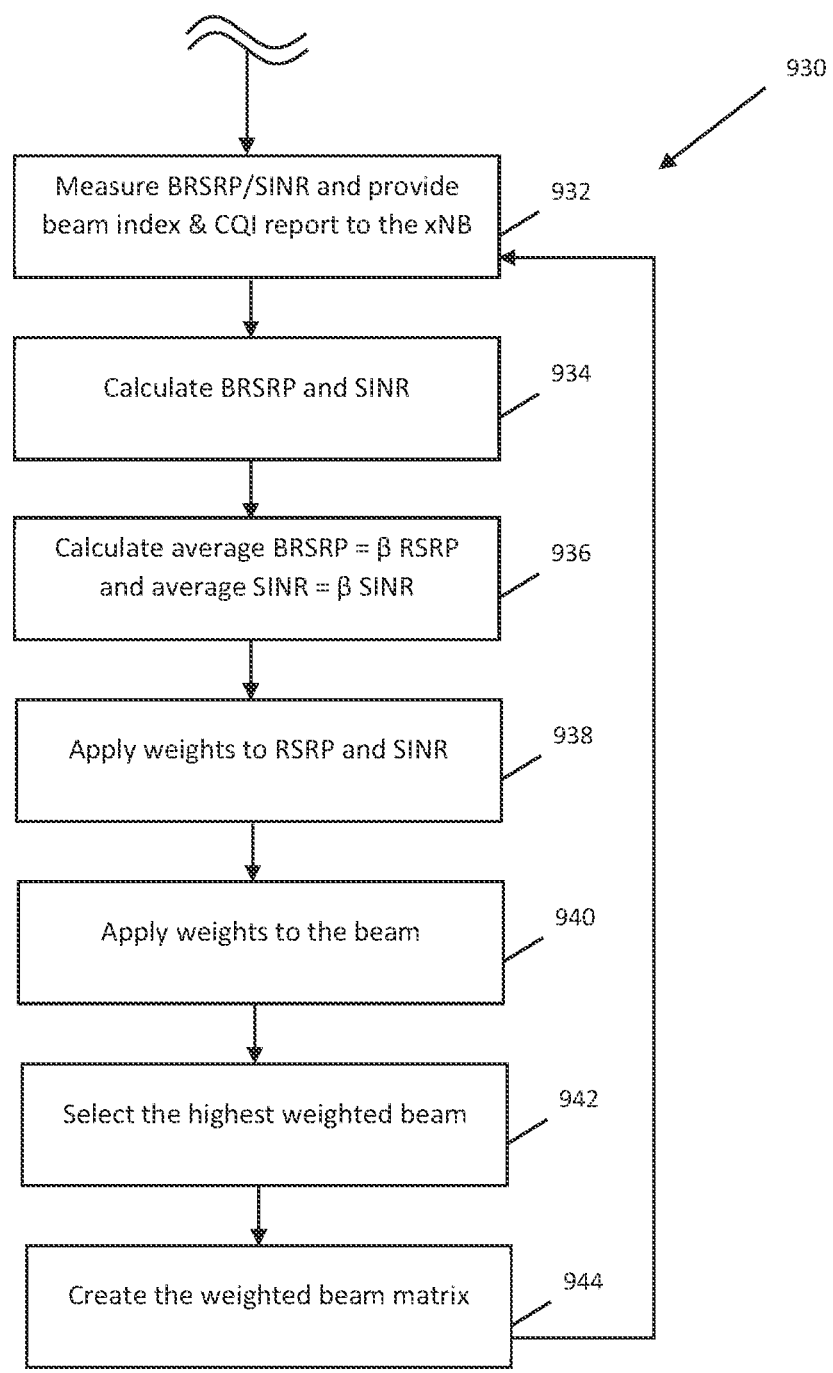
FIG. 9B is a logical flow diagram of an exemplary implementation of the method of FIG. 9, specifically for beam forming and creating a weighted beam matrix, according to the present disclosure.

Referring to FIG. 9B, one implementation of creating a weighted beam matrix (process 930 of the method 910) for beam selection and steering, is shown and described.

At step 932 of the process 530, one or more antenna elements (e.g., the donor unit) of the CPEe 305 measures data related to BRSRP and SINR to determine a beam index, and provides the beam index, as well as a channel quality indicator (CQI) report, to the relevant gNB 206.

At step 934, one or more respective values for the measured BRSRP/SINR data are calculated. For example, in one variant, the method includes using, via a network process, such as, prior data obtained by the CPE to issue commands to the CPE (and others geographically or topologically proximate thereto) to use a recommended propagation channel model, so as the CPE can compute the required BRSRP/SINR based on the recommended model.

In another variant, a network process recommends the CPE a path loss model to use for BRSRP/SINR estimation, and the CPE/FWA uses the recommended model to estimate the BRSRP/SINR.

At step 936 of the process 930, the respective averages for the BRSRP/SINR values are calculated—i.e.:

$$\text{average BRSRP}=\beta\text{RSRP} \qquad \text{Eqn. (2); and}$$

$$\text{average SINR}=\beta\text{SINR} \qquad \text{Eqn. (3);}$$

wherein β=Rolling Average value (in one implementation, the algorithm will take a prescribed number such as six (6) samples of each BRSRP and SINR and keep a rolling or moving average to make the decision).

At step 938 of the process 930, one or more weighted values are applied to the average BRSRP and average SINR calculated above.

The CPE will select the best beam from its matrix and then rank them accordingly based on BRSRP/SINR. Both BRSRP and SINR can be allocated certain weight which is configurable. The weight is operator configurable where the operator can decide on using either BRSRP or SINR to make the selection for the beam e.g. if BRSRP is configured with 100% weight then only the BRSRP values will be used in beam selection and SINR will be ignored. This gives operator flexibility to configure the network for coverage or quality.

The equation for the weight is given by $$\text{Selected beam } W_{beam}=\text{Max}(W_{BRSRP}, W_{SINR})$$

Where
$W_{BRSRP}=1\text{-}100$
$W_{SINR}=1\text{-}100$

At step 940 of the method 930, one or more weighted values are applied to the beam. The CPEe will then select the beam based on weighted BRSRP or SINR as explained above.

At step 942 of the process 930, the beam with the highest weighted value is selected. For example, the CPE can select the preferred/best beam based on the highest weighted value per Eqn. (1) discussed above.

Lastly, at step 942, the weighted beam matrix is created. An exemplary beam matrix 1000 is shown and described with respect to FIG. 10 below.

Exemplary Weighted Beam Matrix—

Referring now to FIG. 20, an exemplary weighted beam matrix 2000 generated by and used with the methods and apparatus previously described herein, is shown. In one embodiment the CPEe 205, 305 is configured to create, store, utilize, and dynamically update a weighted beam matrix such as that shown in in FIG. 20 during, inter alia, CPEe initialization (e.g., after installation) and subsequently thereafter.

In one embodiment, the donor unit 334 of the CPE 305 of FIG. 3 creates the beam matrix 2000 so as to correlate CPE beam data 2005 and gNB beam data 2006, derived from e.g., transmit/receive beams of each respective device. The gNB beam data 2006 can include data relating to beams from multiple gNBs (e.g., gNBs 2-5 as shown). In one variant, the CPEe ranks the beam combinations 2005, 2006 in its index based on channel quality metrics such as BRSRP/SINR. For example, both BRSRP and SINR can be allocated one or more weights (e.g., W1-W6) for each viable beam combination, such weights (and in fact parameters selected for the weighting process) which can be user- or algorithm-configurable.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of extending wireless signals transacted between a computerized client device and at least one base station operating in accordance with a 5G NR (Fifth Generation New Radio) air interface technology standard, the computerized method comprising:
causing a first interface apparatus of the computerized client device to:
obtain data relating to all base station and sector signals received at the first interface apparatus, the data comprising data relating to at least one of (i) beam-Reference Signal Receive Power (BRSRP) or (ii) signal-to-interference-plus-noise ratio (SINR);
provide a beam index and channel quality indicator (CQI) report to the at least one base station;
based at least on the data relating to the at least one of (i) the BRSRP or (ii) the SINR, generate a beam matrix; and
based at least on the beam matrix, select and activate at least one first beam for provision of data communication between the at least one base station and the computerized client device; and
causing a second interface apparatus of the computerized client device to:
transact channel quality data with a target user device; and
based at least on the transacted channel quality data, select and activate at least one second beam for provision of data communication between the computerized client device and the target user device;
wherein the provision of the data communication between the at least one base station and the computerized client device and the provision of the data communication between the computerized client device and the target user device provide an end-to-end data communications link between the at least one base station and the target user device.

2. The computerized method of claim 1, wherein the wireless signals transacted between the computerized client device and the at least one base station comprise millimeter-wave wireless signals which are inaccessible to the target user device due to at least one of an obstruction or physical feature.

3. The computerized method of claim 1, wherein:
the target user device is disposed at a premises different than that of the computerized client device; and
the computerized method further comprises providing small cell service coverage for a second user device using a third interface apparatus of the computerized client device.

4. The computerized method of claim 3, wherein the provision of the data communication between the at least one base station and the computerized client device, comprises providing data communication associated with at user plane (UP) data of the target user device and UP data of the second user device.

5. The computerized method of claim 1, wherein:
the target user device comprises a mobile user device; and
the causing of the transaction of the channel quality data with the target user device, and selection and activation of the least one second beam for the provision of the data communication between the computerized client device and the target user device, comprises periodic transacting of the channel quality data and beam selection in order to account for changes in channel quality due to movement of the mobile user device.

6. The computerized method of claim 1, wherein:
the target user device comprises a mobile user device; and
the computerized method further comprises causing handoff of the target user device to a second computerized client device associated with a common network operator as the computerized client device, the causing of the handoff based at least on periodic transacting of the channel quality data between the target user device and the computerized client device.

7. The computerized method of claim 1, wherein the causing of the first interface apparatus of the computerized client device to, based at least on the beam matrix, select and activate the at least one first beam for the provision of the data communication between the at least one base station and the computerized client device, comprises causing the first interface apparatus of the computerized client device to, based at least on the beam matrix, select and activate respective ones of first beam for provision of simultaneous data communication between a plurality of base stations and the computerized client device.

8. The computerized method of claim 7, wherein the provision of the simultaneous data communication between the plurality of base stations and the computerized client device comprises provision of spatially multiplexed data between the plurality of base stations and the computerized client device such that each of the plurality of base stations transacts only a portion of the data communication.

9. A computerized method of operating a premises wireless apparatus to extend wireless signal connectivity with at least one base station, the computerized method comprising:
utilizing at least a first wireless interface of the premises wireless apparatus to provide a wireless service to at least a first user premises;
generating a beam matrix based on evaluation of one or more wireless channels between at least second wireless interface and the at least one base station;
selecting at least one beam from the generated beam matrix to use for data communication between the premises wireless apparatus and the at least one base station; and
utilizing at least the second wireless interface of the premises wireless apparatus to cause the data communication between the premises wireless apparatus and the at least one base station, the data communication enabling at least one of (i) beam selection, (ii) beam steering, or (iii) beam redundancy; and
utilizing at least a third wireless interface of the premises wireless apparatus to extend the wireless service to at least a second user premises.

10. The computerized method of claim 9, wherein:
the utilizing at least the first wireless interface of the premises wireless apparatus to provide the wireless service to at least the first user premises comprises utilizing a 3GPP (Third Generation Partnership Project) 5G-NR (Fifth Generation-New Radio) compliant node to transmit signals to one or more areas inside of a structure of the first user premises; and
the utilizing at least the third wireless interface of the premises wireless apparatus to extend the wireless service to at least the second user premises comprises configuring the premises wireless apparatus to substantially repeat at least parts of the data communication between the premises wireless apparatus and the at least one base station to one or more areas outside of the structure on the user premises via one or more antenna elements mounted externally to or on the structure.

11. The computerized method of claim 10, wherein:
the at least one base station comprises a Fifth Generation New Radio gNodeB (5G NR gNB); and
the configuring of the premises wireless apparatus to substantially repeat the at least parts of the data communication between the premises wireless apparatus and the at least one base station to the one or more areas outside of the structure on the user premises comprises configuring the premises wireless apparatus to substantially repeat the at least parts of the data communication between the premises wireless apparatus and the at least one base station to the one or more areas outside of the structure on the user premises via the one or more antenna elements mounted externally to or on the structure comprises causing transmission of signals within a frequency range between 24 and 200 GHz inclusive.

12. The computerized method of claim 9, wherein each of the first, second and third wireless interfaces comprise a 3GPP (Third Generation Partnership Project) 5G-NR (Fifth Generation-New Radio) compliant interface configured to operate in within a frequency range between 24 and 200 GHz inclusive at least during performance of the computerized method.

13. The computerized method of claim 9, wherein:
each of the second and third wireless interfaces comprise a 3GPP (Third Generation Partnership Project) 5G-NR (Fifth Generation-New Radio) compliant interface configured to operate in within a frequency band between 24 and 200 GHz inclusive at least during performance of the computerized method; and
the first wireless interface comprises a 3GPP 4G (Fourth Generation) or 5G-NR compliant interface configured to operate in a frequency band below 6 GHz at least during performance of the computerized method.

14. The computerized method of claim 9, wherein:
the first wireless interface comprises a wireline modem apparatus, the wireline modem apparatus configured to backhaul at least the first wireless interface of the premises wireless apparatus via a radio frequency (RF) distribution wireline network to a service provider core.

15. The computerized method of claim 9, further comprising:
generating a second beam matrix based on evaluation of one or more wireless channels between the third wireless interface and at least one wireless device disposed at the second user premises; and
selecting at least one second beam from the generated second beam matrix to use for data communication between the premises wireless apparatus and the at least one wireless device.

16. The computerized method of claim 9, further comprising ranking a plurality of beams of the beam matrix based on respective values associated with at least one of BRSRP or SINR;
wherein the selecting of the at least one beam from the generated beam matrix comprises selecting the at least one beam from the generated beam matrix based on the ranking.

17. The computerized method of claim 16, further comprising allocating one or more weights to the respective values associated with the at least one of BRSRP or SINR, the one or more weights being configurable.

18. A computerized premises wireless apparatus, comprising:
a first wireless interface comprising a beam steering and beam selection capability, the beam steering and beam selection capability configured to enable alignment of the first wireless interface with at least one base station so as to optimize at least reception of a first wireless signal transmitted form the at least one base station;
a second wireless interface in data communication with the first wireless interface;
processor apparatus in data communication with the first wireless interface and the second wireless interface;
a third wireless interface in data communication with the processor apparatus and configured to provide localized wireless coverage at a premises within which the computerized premises wireless apparatus is disposed; and
storage apparatus in data communication with the processor apparatus and comprising a storage medium, the storage medium comprising at least one computer program configured to, when executed by the processor apparatus, cause the computerized premises wireless apparatus to:
enable operation of the computerized premises wireless apparatus in a first mode, the first mode comprising a mode wherein the first wireless interface is used as a backhaul for the computerized premises wireless apparatus; and enable operation of the computerized premises wireless apparatus in a second mode, the second mode comprising a mode wherein the second wireless interface is used as an extension for a wireless-enabled user device in data communication with the computerized premises wireless apparatus;

wherein:

the third wireless interface is configured to operate as at least a 5G mmWave signal transmitter of at least a portion of second user plane (UP) data received via the first wireless interface, the second UP data associated with a user application then operative on a second wireless-enabled user device, the second wireless-enabled user device disposed within an area of the localized wireless coverage.

19. The computerized premises wireless apparatus of claim 18, wherein the first wireless interface is configured to operate as at least a 5G (Fifth Generation) mmWave signal receiver, and the second wireless interface is configured to operate as at least a 5G mmWave signal transmitter of at least a portion of first user plane (UP) data received via the first wireless interface, the first UP data associated with a user application then operative on the wireless-enabled user device.

20. The computerized premises wireless apparatus of claim 18, wherein the at least one computer program is further configured to, when executed by the processor apparatus, cause the computerized premises wireless apparatus to:

in the second mode, utilize the second wireless interface to cause data communication between the computerized premises wireless apparatus and the at least one base station to extend wireless signals to the wireless-enabled user device, the data communication enabling at least one of (i) beam selection, (ii) beam steering, or (iii) beam redundancy.

* * * * *